United States Patent
Saito et al.

(10) Patent No.: US 12,298,277 B2
(45) Date of Patent: May 13, 2025

(54) DATA PROCESSING DEVICE, DATA PROCESSING SYSTEM, DATA PROCESSING METHOD, AND STORAGE MEDIUM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Masahiro Saito, Yokohama (JP); Yasunori Chiba, Yokohama (JP); Hiromasa Takahashi, Minato (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 272 days.

(21) Appl. No.: 17/865,588

(22) Filed: Jul. 15, 2022

(65) Prior Publication Data
US 2023/0024687 A1 Jan. 26, 2023

(30) Foreign Application Priority Data
Jul. 19, 2021 (JP) .................. 2021-119054

(51) Int. Cl.
*G01N 29/44* (2006.01)
*G01N 29/06* (2006.01)

(52) U.S. Cl.
CPC ......... *G01N 29/44* (2013.01); *G01N 29/0654* (2013.01); *G01N 2291/02854* (2013.01);
(Continued)

(58) Field of Classification Search
CPC ...... B23K 1/255; B23K 1/257; B23K 11/115; B23K 31/125; G01N 29/043;
(Continued)

(56) References Cited

U.S. PATENT DOCUMENTS 6,198,071 B1 3/2001 Kitsunai
2011/0172941 A1 7/2011 Sakaguchi
(Continued)

FOREIGN PATENT DOCUMENTS

JP 06-155252 A 6/1994
JP 2000-042782 A 2/2000
(Continued)

OTHER PUBLICATIONS

Japanese Office Action issued Oct. 4, 2024 in Japanese Application 2021-119054, (with unedited computer-generated English translation), 6 pages.

*Primary Examiner* — John H Le
(74) *Attorney, Agent, or Firm* — Oblon, McClelland, Maier & Neustadt, L.L.P.

(57) ABSTRACT

According to one embodiment, a data processing device receives welding device data from a welding device. The welding device makes a joined body by joining a plurality of parts. The welding device data includes a welding device ID for identifying the welding device. The data processing device receives inspection data. The inspection data includes position data and angle data. The position data is of a position of a weld portion of the joined body. The position data are calculated from a result of a probe of the joined body. The probe uses an ultrasonic wave. The angle data is of an angle of the weld portion. The data processing device associates the inspection data with the welding device data.

21 Claims, 29 Drawing Sheets

(52) U.S. Cl.
CPC ............... *G01N 2291/0289* (2013.01); *G01N 2291/267* (2013.01)

(58) Field of Classification Search
CPC .... G01N 29/0654; G01N 29/11; G01N 29/44; G01N 2291/02854; G01N 2291/0289; G01N 2291/044; G01N 2291/267
USPC .......................................................... 702/39
See application file for complete search history.

(56) References Cited

U.S. PATENT DOCUMENTS

| | | |
|---|---|---|
| 2014/0263227 A1 | 9/2014 | Daniel et al. |
| 2015/0346164 A1* | 12/2015 | St-Laurent ............. G01N 29/32 73/588 |
| 2020/0018727 A1 | 1/2020 | Ono et al. |
| 2020/0363377 A1 | 11/2020 | Saito et al. |
| 2021/0086282 A1 | 3/2021 | Saito et al. |

FOREIGN PATENT DOCUMENTS

| | | |
|---|---|---|
| JP | 2007-278809 A | 10/2007 |
| JP | 2018-18524 A | 2/2018 |
| JP | 2018-094575 A | 6/2018 |
| JP | 2019-184620 A | 10/2019 |
| JP | 2020-008452 A | 1/2020 |
| JP | 2020-038218 A | 3/2020 |
| JP | 2020-187005 A | 11/2020 |
| JP | 2021-39100 A | 3/2021 |

* cited by examiner

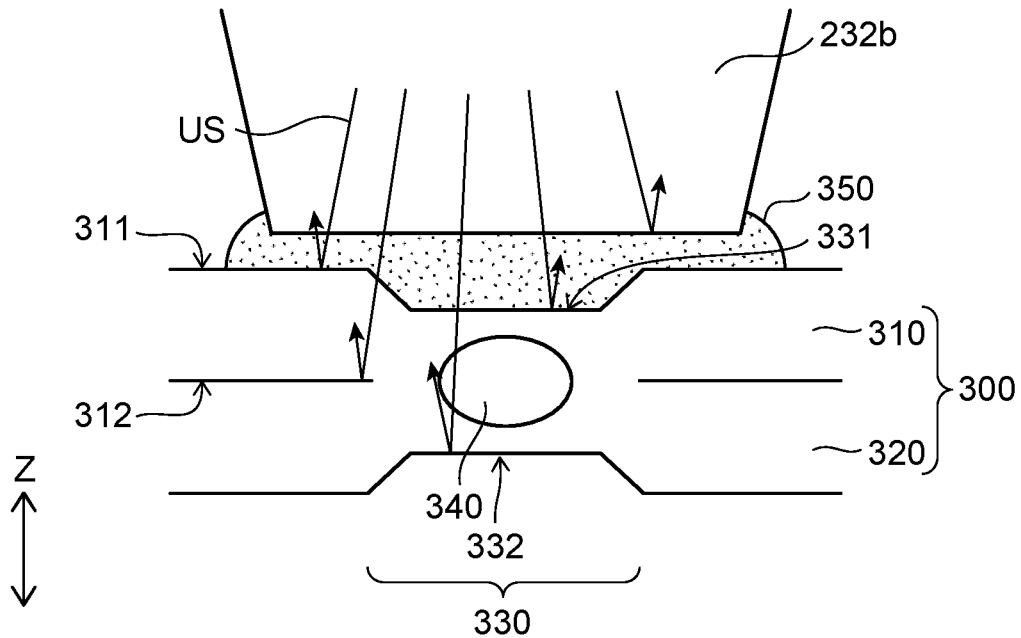
FIG. 12A
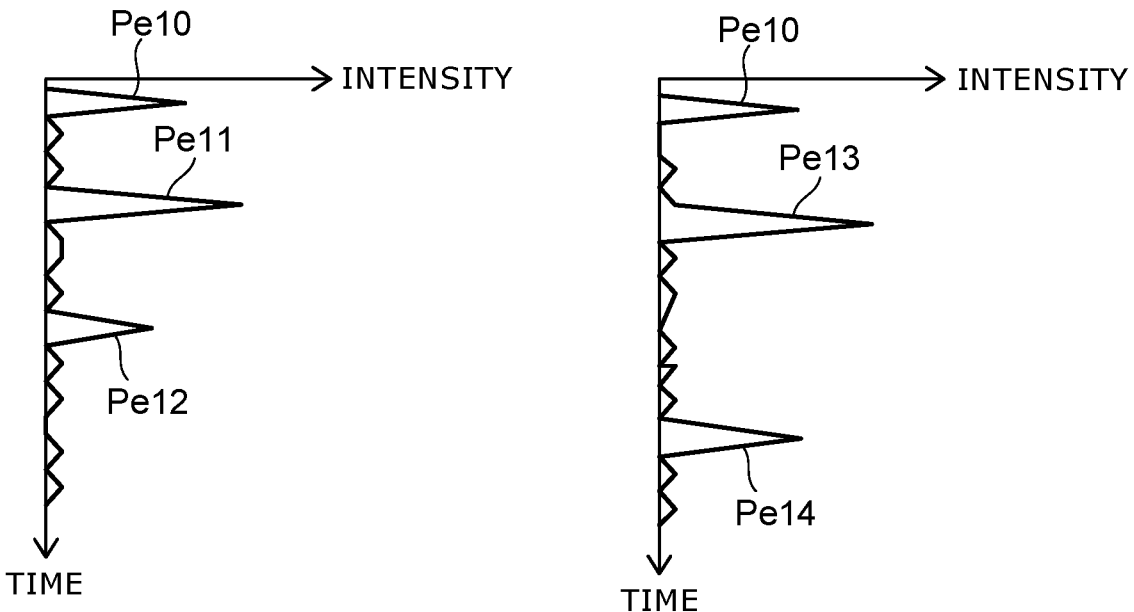
FIG. 12B
FIG. 12C

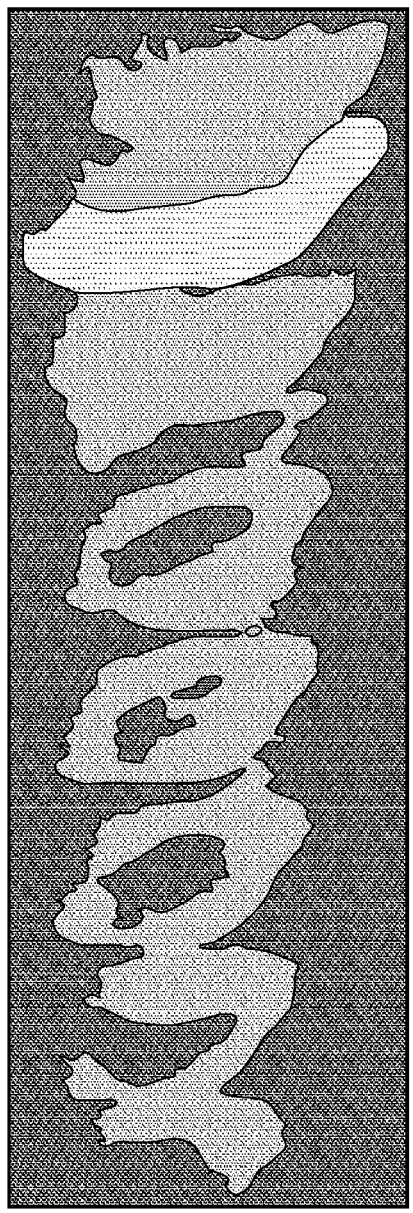
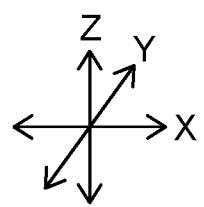
FIG. 13

| INSPECTION DATA ID | INSPECTION DEVICE | IMAGE DATA | CENTER POSITION (X,Y) | APPARENT POSITION (X,Y) | ANGLE (θx,θy) |
|---|---|---|---|---|---|
| IR101 | IA101 | ID101 | 0.5, 1 | 0.6, 1.2 | 0.5, 1 |
| IR102 | IA101 | ID102 | -0.2, 0.5 | -0.1, 0.4 | -0.5, 0.8 |
| IR103 | IA101 | ID103 | 0.6, 0.2 | 0.6, 0.3 | 2, 1.5 |
| IR104 | IA101 | ID104 | -0.8, 0.9 | -1.0, 0.9 | 1.2, -1.5 |
| IR105 | IA101 | ID105 | 0.1, 0.3 | 0.2, 0.4 | 1.0, -0.5 |

| INSPECTION DATA ID | THICKNESS (mm) | DEPTH (mm) | DIAMETER (mm) | DETERMINATION RESULT | INSPECTION TIME (TIME/M/D/Y) |
|---|---|---|---|---|---|
| IR101 | 0.98 | 0.15 | 3.9 | ○ | 10:31:27/1/8/2021 |
| IR102 | 0.94 | 0.18 | 4.1 | ○ | 10:32:05/1/8/2021 |
| IR103 | 0.99 | 0.12 | 4.0 | ○ | 10:32:35/1/8/2021 |
| IR104 | 0.82 | 0.24 | 4.4 | ○ | 10:34:24/1/8/2021 |
| IR105 | 0.84 | 0.22 | 4.6 | ○ | 10:34:51/1/8/2021 |

FIG. 17

| ASSOCIATION DATA ID | WELD PORTION ID | WELDING DEVICE ID | CONDITION DATA ID | INSPECTION DATA ID |
|---|---|---|---|---|
| AS101 | WP101 | WA101 | CD101 | IR101 |
| AS102 | WP102 | WA101 | CD102 | IR102 |
| AS103 | WP103 | WA101 | CD103 | IR103 |
| AS104 | WP104 | WA102 | CD104 | IR104 |
| AS105 | WP105 | WA102 | CD105 | IR105 |

LARGE TILT (601)

| | WELDING DEVICE (621) | ELECTRODE (622) | WELDING CONDITION (623) | TRANSFER DEVICE (624) |
|---|---|---|---|---|
| SPECIFIC WELDING DEVICE (611) | 10 | 2 | 1 | 0 |
| SPECIFIC WELD PORTION (612) | 5 | 5 | 3 | 1 |
| DIRECTLY AFTER PRODUCT TYPE SWITCH (613) | 1 | 1 | 1 | 2 |
| LOW NUMBER OF ELECTRODE USES (614) | 0 | 5 | 0 | 0 |
| HIGH NUMBER OF ELECTRODE USES (615) | 0 | 6 | 0 | 0 |
| LARGE MISALIGNMENT (616) | 4 | 4 | 1 | 4 |

FIG. 29B

SMALL WELD DIAMETER (602)

| | WELDING DEVICE (621) | ELECTRODE (622) | WELDING CONDITION (623) | TRANSFER DEVICE (624) |
|---|---|---|---|---|
| SPECIFIC WELDING DEVICE (611) | 10 | 2 | 1 | 0 |
| SPECIFIC WELD PORTION (612) | 5 | 5 | 3 | 4 |
| DIRECTLY AFTER PRODUCT TYPE SWITCH (613) | 2 | 1 | 1 | 2 |
| LOW NUMBER OF ELECTRODE USES (614) | 0 | 8 | 0 | 0 |
| HIGH NUMBER OF ELECTRODE USES (615) | 0 | 10 | 0 | 0 |
| LARGE MISALIGNMENT (616) | 4 | 4 | 1 | 4 |
| LARGE TILT (617) | 5 | 2 | 3 | 4 |

FIG. 30A

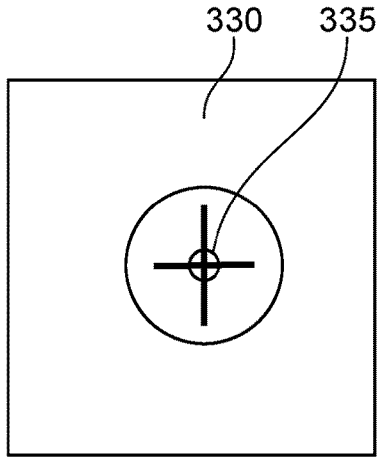

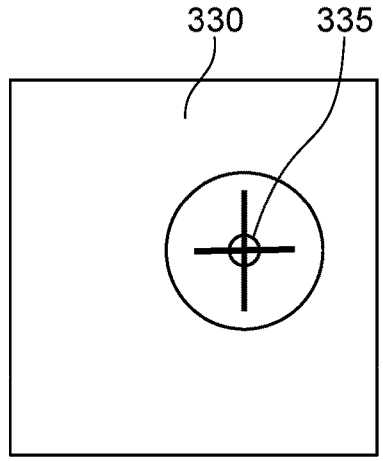

- WELDING DEVICE A
- JOINED BODY A
- PRODUCT TYPE X
- WELD PORTION NUMBER Y
- CENTER POSITION (0.5, 0.5)
- INSPECTION PROBE ANGLE (0.03, 0.05)
- EQUIPMENT OPERATION START 2015/06/05
- NUMBER OF CONSECUTIVE ELECTRODE USES 534

FIG. 30D

- WELDING DEVICE B
- JOINED BODY B
- PRODUCT TYPE X
- WELD PORTION NUMBER Y
- CENTER POSITION (5,-3) ⚠ 523
- INSPECTION PROBE ANGLE (1.2, 0.5)
- EQUIPMENT OPERATION START 2021/2/10 ⚠
- NUMBER OF CONSECUTIVE ELECTRODE USES 1231
  523

FIG. 30E

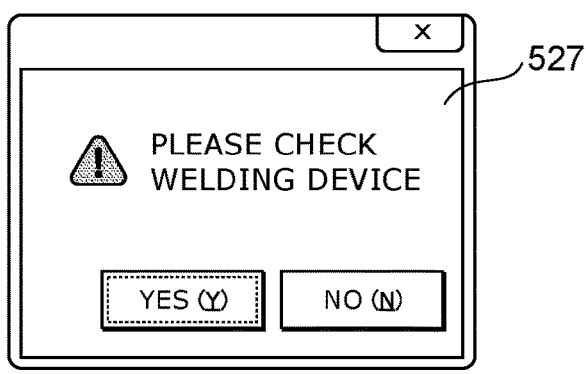

527

⚠ PLEASE CHECK WELDING DEVICE

YES (Y)   NO (N)

FIG. 31A

- WELDING DEVICE A
- JOINED BODY B
- PRODUCT TYPE X
- WELD PORTION NUMBER Y
- CENTER POSITION (5, -3) ⚠ 523
- INSPECTION PROBE ANGLE (1.2, 0.5)
- EQUIPMENT OPERATION START 2016/10/29
- NUMBER OF CONSECUTIVE ELECTRODE USES 2561 ⚠ 523

FIG. 31C

- WELDING DEVICE A
- JOINED BODY B
- PRODUCT TYPE P
- WELD PORTION NUMBER Q
- CENTER POSITION (5,-3) ⚠ 523
- INSPECTION PROBE ANGLE (1.2, 0.5)
- EQUIPMENT OPERATION START 2026/10/29
- NUMBER OF CONSECUTIVE ELECTRODE USES 1 ⚠ 523

FIG. 31B

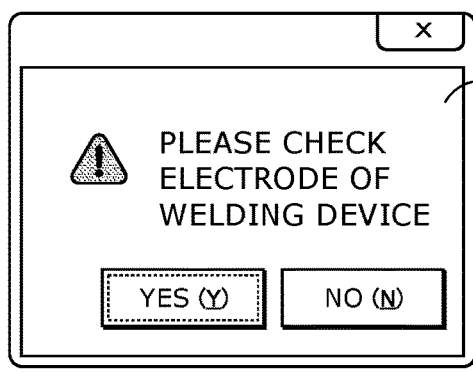

PLEASE CHECK ELECTRODE OF WELDING DEVICE — YES (Y) / NO (N) — 527

FIG. 31D

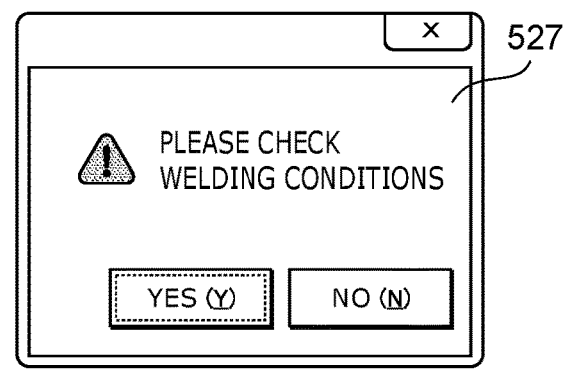

PLEASE CHECK WELDING CONDITIONS — YES (Y) / NO (N) — 527

DATA PROCESSING DEVICE, DATA PROCESSING SYSTEM, DATA PROCESSING METHOD, AND STORAGE MEDIUM

CROSS-REFERENCE TO RELATED APPLICATIONS

This application is based upon and claims the benefit of priority from Japanese Patent Application No. 2021-119054, filed on Jul. 19, 2021; the entire contents of which are incorporated herein by reference.

FIELD

Embodiments described herein relate generally to a data processing device, a data processing system, a data processing method, and a storage medium.

BACKGROUND

There is a welding device that welds multiple parts. Also, there is an inspection device that inspects a joined body that is welded. Various data related to welding and inspection is obtained in a manufacturing line that includes a welding device and an inspection device. It is desirable to develop technology that can improve the convenience of such data.

BRIEF DESCRIPTION OF THE DRAWINGS

FIGS. 12A to 12C are schematic views for describing operations of the inspection device according to the embodiment;
FIG. 13 is an example of an image of a three-dimensional reflected wave intensity distribution;
FIG. 17 is a table illustrating inspection data;
FIG. 18 is a table illustrating association data;
FIGS. 29A and 29B are tables illustrating corresponding data;
FIGS. 30A to 30E describe output examples;
FIGS. 31A to 31D describe output examples.

DETAILED DESCRIPTION

Figure 1:
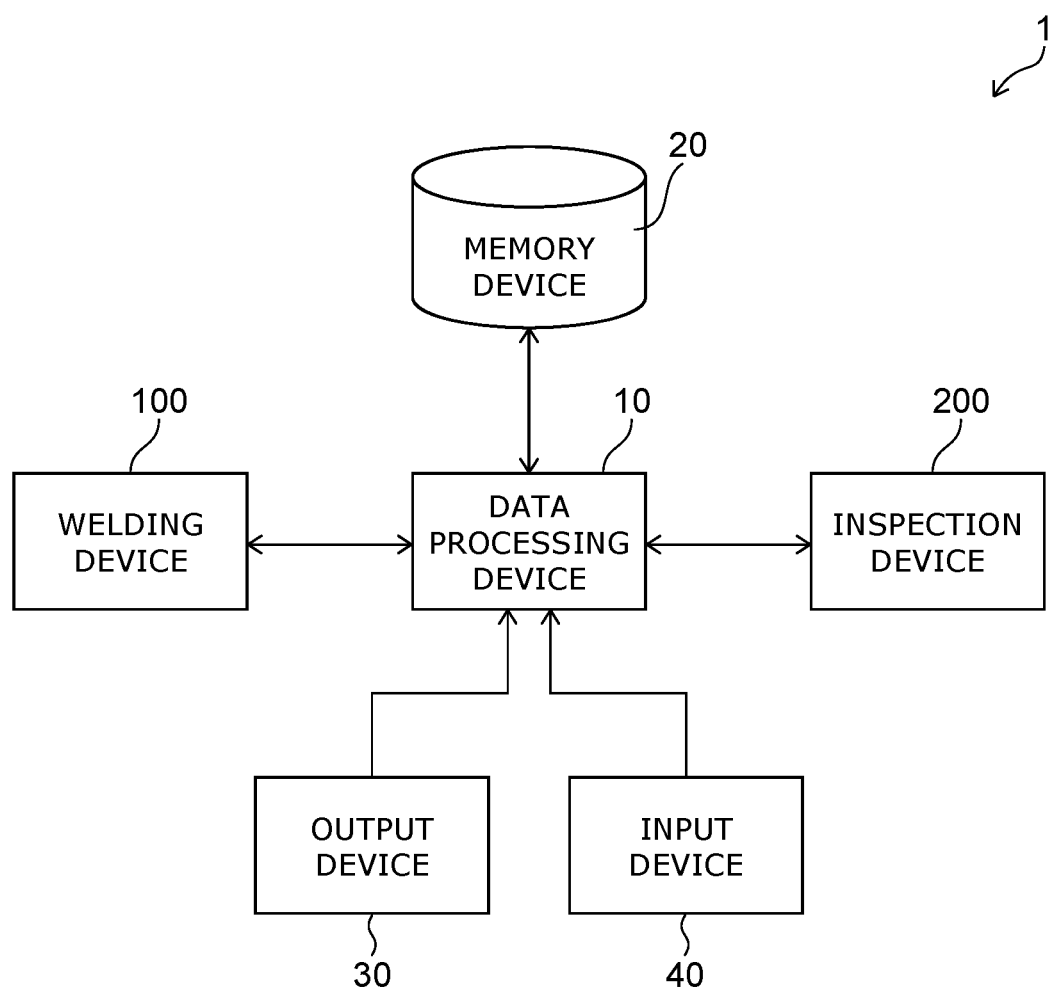
FIG. 1 is a schematic view showing a data processing system according to an embodiment.

According to one embodiment, a data processing device receives welding device data from a welding device. The welding device makes a joined body by joining a plurality of parts. The welding device data includes a welding device ID for identifying the welding device. The data processing device receives inspection data. The inspection data includes position data and angle data. The position data is of a position of a weld portion of the joined body. The position data are calculated from a result of a probe of the joined body. The probe uses an ultrasonic wave. The angle data is of an angle of the weld portion. The data processing device associates the inspection data with the welding device data.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a data processing system according to an embodiment.

The data processing system 1 according to the embodiment includes a data processing device 10, a memory device 20, an output device 30, an input device 40, a welding device 100, and an inspection device 200.

The data processing device 10 receives data from the welding device 100 and the inspection device 200 and processes the received data. When processing the data, the data processing device 10 refers to data stored in the memory device 20 as appropriate. Also, the data processing device 10 stores the data obtained by the processing in the memory device 20 as appropriate. The data processing device 10 causes the output device 30 to output the data. A user can use the input device 40 to input data to the data processing device 10.

The welding device 100 manufactures a joined body by joining multiple parts (metal plates). For example, the welding device 100 performs resistance spot welding. The welding device 100 transmits, to the data processing device 10, welding device data of information related to the welding device 100 itself, welding condition data of the implemented welding conditions and the like, weld portion data of information related to the weld portion, etc.

The inspection device 200 inspects the joined body welded by the welding device 100. The inspection is performed based on data obtained by a probe using an ultrasonic wave. The inspection device 200 transmits the inspection data obtained by the inspection to the data processing device 10.

First, a specific example of the welding device 100 and various data obtained by the welding device 100 will be described.

Welding Device

Figure 2:
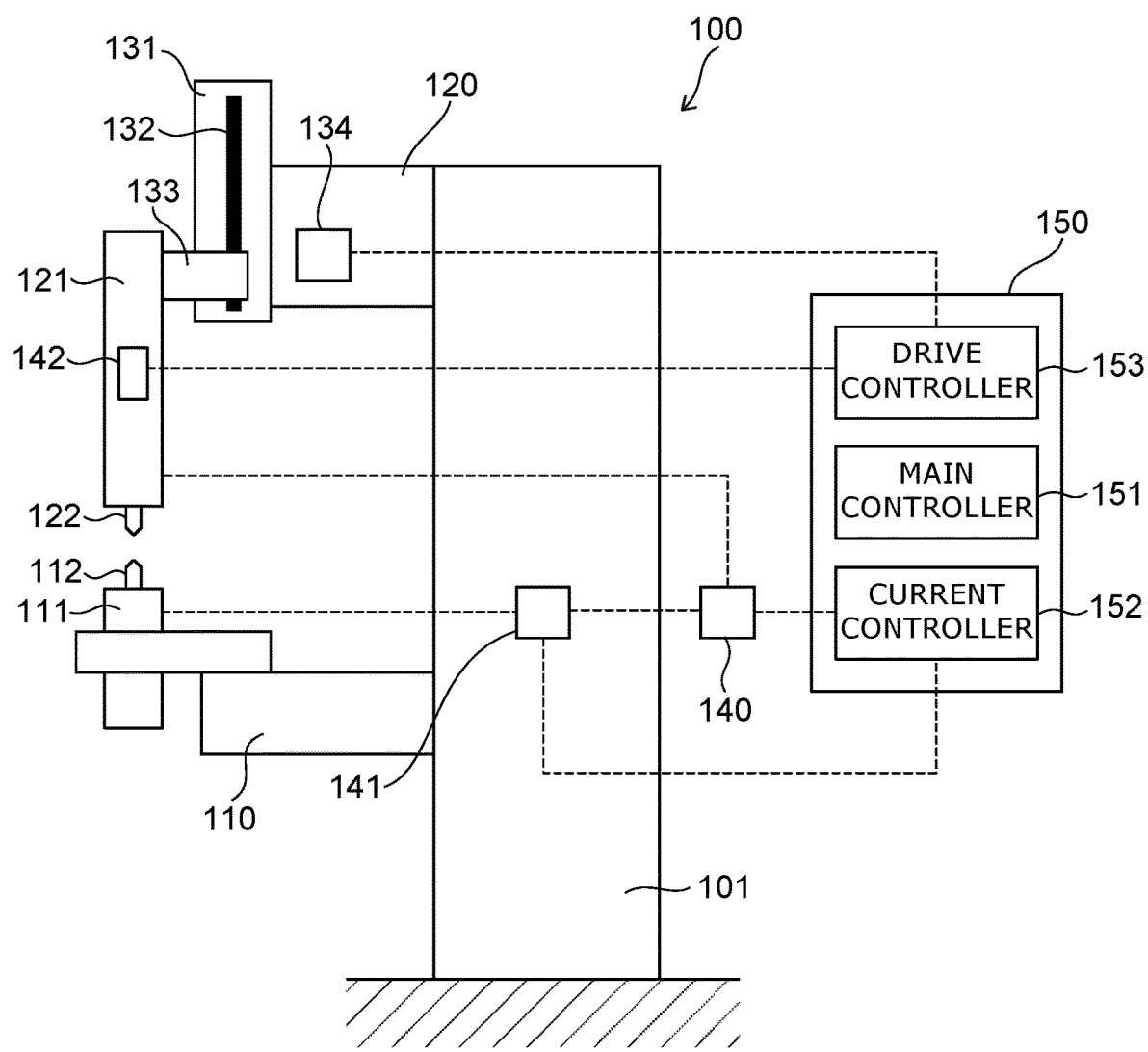
FIG. 2 is a schematic view illustrating a welding device.

FIG. 2 is a schematic view illustrating a welding device.

An example of the welding device 100 will now be described. As illustrated in FIG. 2, the welding device 100 includes a base 101, a lower arm 110, a lower holder 111, a lower electrode 112, an upper arm 120, an upper holder 121, an upper electrode 122, a guide 131, a movable member 133, a driver 134, a power supply 140, a current detecting part 141, and a pressure detecting part 142.

The base 101 is fixed in a prescribed location in a manufacturing site. The lower arm 110 and the upper arm 120 are fixed to the base 101. The lower arm 110 and the upper arm 120 are separated from each other and face each other in the vertical direction. For the description herein, the direction from the lower arm 110 toward the upper arm 120 is called "up", and the opposite direction is called "down". These directions are based on the positional relationship between the lower arm 110 and the upper arm 120 and do not suggest the direction of gravity. The direction from the lower arm 110 toward the upper arm 120 may cross the vertical direction.

The lower holder 111 is mounted to the lower arm 110. The lower holder 111 may be movable with respect to the lower arm 110. The lower electrode 112 is fixed to the lower holder 111 and protrudes upward.

The guide 131 is fixed to the upper arm 120. The guide 131 includes a pole 132 extending along the vertical direction. The movable member 133 is mounted to the pole 132. The upper holder 121 is fixed to the movable member 133. The upper electrode 122 is fixed to the upper holder 121 and protrudes downward. The lower electrode 112 and the upper electrode 122 face each other in the vertical direction.

The driver 134 moves the movable member 133. The movable member 133 moves along the pole 132. When the movable member 133 moves, the position in the vertical direction of the upper electrode 122 changes with respect to the lower electrode 112. In other words, the distance in the vertical direction between the lower electrode 112 and the upper electrode 122 changes.

The power supply 140 is electrically connected with the lower electrode 112 and the upper electrode 122. The power supply 140 applies a voltage between the lower electrode 112 and the upper electrode 122 when welding. For example, the power supply 140 connects the lower electrode 112 to a ground potential and applies a voltage to the upper electrode 122. Thereby, a current is caused to flow between the lower electrode 112 and the upper electrode 122.

The current detecting part 141 detects the current flowing through the lower electrode 112 and the upper electrode 122 when welding. In the illustrated example, the current detecting part 141 is electrically connected between the power supply 140 and the lower electrode 112. The current detecting part 141 includes, for example, an ammeter.

When welding, the pressure detecting part 142 detects the pressure applied to the parts to be welded. In the illustrated example, the pressure detecting part 142 is located in the upper holder 121 and detects the pressure applied to the upper electrode 122. The pressure that is applied to the upper electrode 122 has a relationship with the pressure on the parts. In other words, the pressure detecting part 142 indirectly detects the pressure applied to the parts to be welded based on the pressure applied to the upper electrode 122. The pressure detecting part 142 includes, for example, a strain gauge.

A control device 150 includes a main controller 151, a current controller 152, and a drive controller 153. The main controller 151 transmits commands to the current controller 152 and the drive controller 153. For example, the main controller 151 transmits various setting values when welding to the current controller 152 and the drive controller 153.

The current controller 152 is electrically connected with the power supply 140 and the current detecting part 141. The current controller 152 controls the power supply 140 based on the detection result of the current detecting part 141. For example, the current controller 152 controls the power supply 140 to cause the current flowing through the lower electrode 112 and the upper electrode 122 to be the setting value transmitted from the main controller 151. The current controller 152 supplies the current between the lower electrode 112 and the upper electrode 122 for the time indicated by the setting value transmitted from the main controller 151.

The drive controller 153 is electrically connected with the driver 134 and the pressure detecting part 142. The drive controller 153 controls the driver 134. For example, the drive controller 153 controls the driver 134 to cause the pressure on the parts to be welded to be the setting value transmitted from the main controller 151.

The welding device 100 that is controlled by the control device 150 is not limited to the example illustrated in FIG. 2; and other known structures are applicable. For example, the welding device may include a manipulator. The lower arm 110, the lower holder 111, the lower electrode 112, the upper arm 120, the upper holder 121, the upper electrode 122, etc., may be provided as end effectors at the distal end of the manipulator.

Figure 3A:
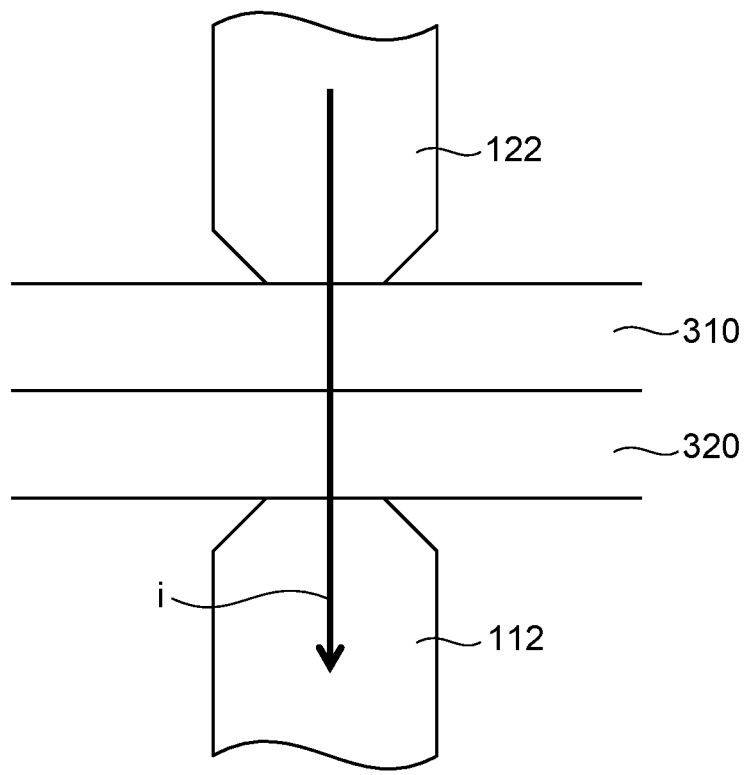
FIGS. 3A and 3B are schematic views illustrating resistance spot welding.
Figure 3B:
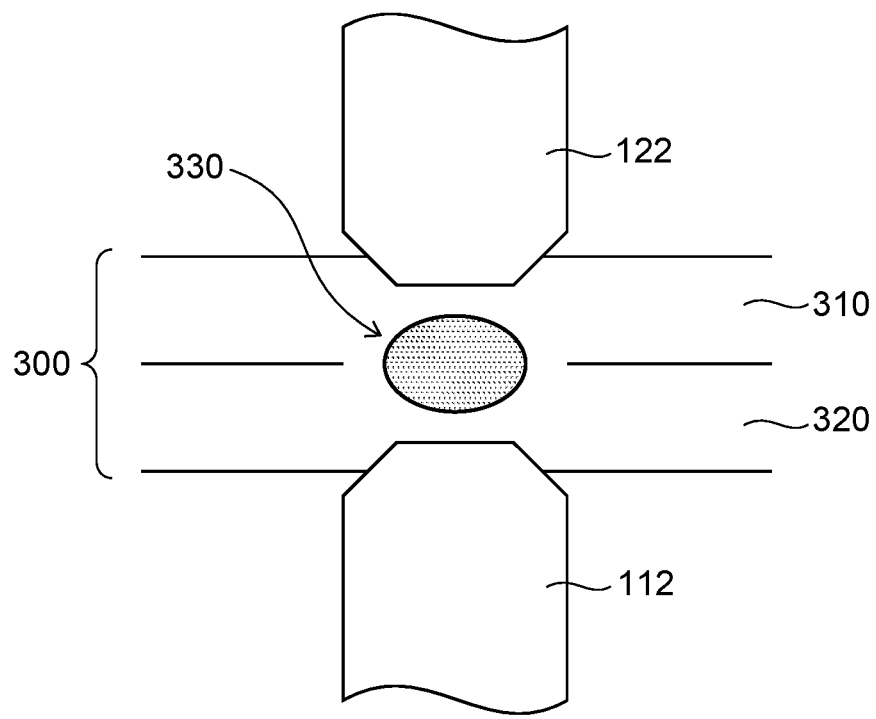

FIGS. 3A and 3B are schematic views illustrating resistance spot welding.

FIG. 3A illustrates a metal plate 310 and a metal plate 320 welded by resistance spot welding. First, the metal plate 310 and the metal plate 320 are placed on the lower electrode 112. The driver 134 moves the upper electrode 122 toward the lower electrode 112. The metal plate 310 and the metal plate 320 are clamped and pressed by the lower electrode 112 and the upper electrode 122. In this state, a current i is supplied to the lower electrode 112, the metal plate 310, the metal plate 320, and the upper electrode 122. Heat is generated by the resistance of the metal plates 310 and 320 when the current i flows. Portions of the metal plates 310 and 320 melt and mix with each other. As illustrated in FIG. 3B, a weld portion 330 is formed by the melted portions cooling and solidifying. A joined body 300 is made by the metal plates 310 and 320 joining with each other in the weld portion 330.

Figures 4, 5:
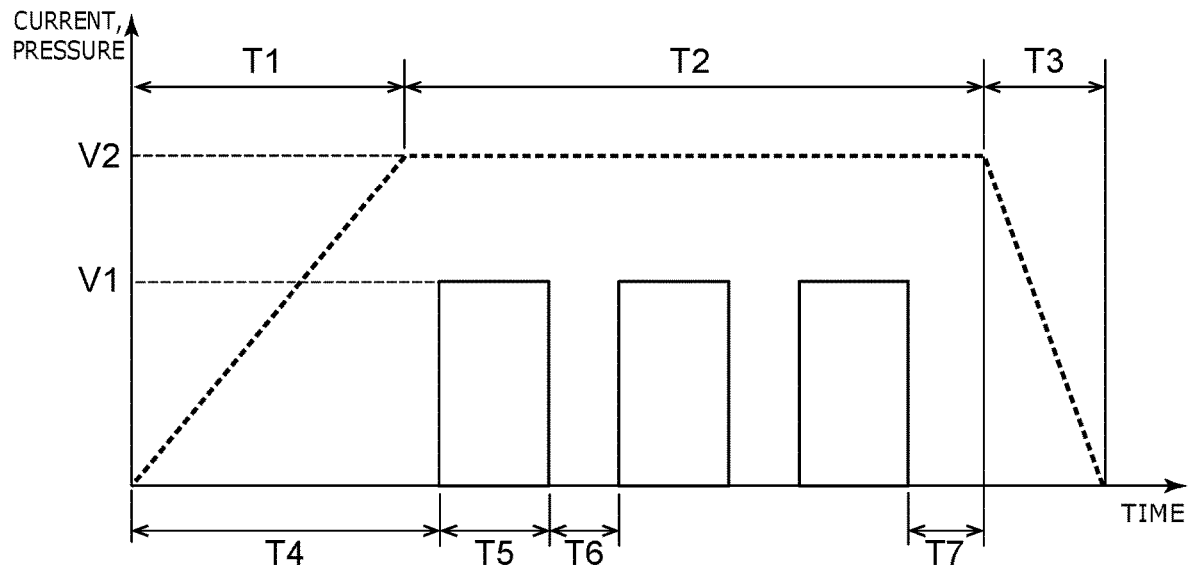
FIG. 4 is a schematic view illustrating the current and the pressure in the resistance spot welding.
FIG. 5 is a table illustrating part data.

FIG. 4 is a schematic view illustrating the current and the pressure in the resistance spot welding.

In FIG. 4, the horizontal axis is time. The vertical axis is the magnitudes of the current and the pressure. The solid line illustrates the change of the current flowing through the lower electrode 112 and the upper electrode 122. The broken line illustrates the change of the pressure on the object of the resistance spot welding.

For example, as illustrated in FIG. 3A, the pressure that is applied from the upper electrode 122 to the metal plate 310 is increased when the upper electrode 122 moves toward the lower electrode 112 and contacts the metal plate 310. The pressure is maintained at a constant after being increased to a prescribed value. A current is supplied in pulses to the metal plates 310 and 320 in the state in which the pressure is maintained at the prescribed value. After supplying the current, the state in which the metal plate 310 is pressurized is maintained. Subsequently, the pressure that is applied from the upper electrode 122 to the metal plate 310 is reduced.

Standard values are predetermined for an increase time T1 of the pressure, a pressing time T2, a decrease time T3 of the pressure, a squeeze time T4, a conduction time T5, an off-time T6 of the current, a holding time T7, a current value V1, and a pressing force value V2 illustrated in FIG. 4. The squeeze time T4 is the time from the start of the pressurizing of the metal plate 310 to the start of the supply of the current. The holding time T7 is the time from the end of the supply of the current to the end of the pressurizing of the metal plate 310. The current value V1 is the maximum value of the current flowing through the lower electrode 112 and the upper electrode 122. The pressing force value V2 is the maximum value of the pressure applied to the metal plate 310.

Data

When performing the welding, the data processing device 10 or the control device 150 identifies the part to be welded based on various sensors, operation logs of the transfer devices, etc. The data processing device 10 accesses the memory device 20 and refers to part data of information of the part to be welded. When the welding device 100 welds multiple parts, the control device 150 transmits the weld portion data, the welding condition data, and the welding device data to the data processing device 10. The weld portion data, the welding condition data, and the welding device data may be transmitted to the data processing device 10 via a higher-level processing device that manages the multiple welding devices 100. The data processing device 10 associates the data of the part to be welded with the weld portion data. Also, the data processing device 10 associates the weld portion data, the welding condition data, and the welding device data with each other.

Figure 6:
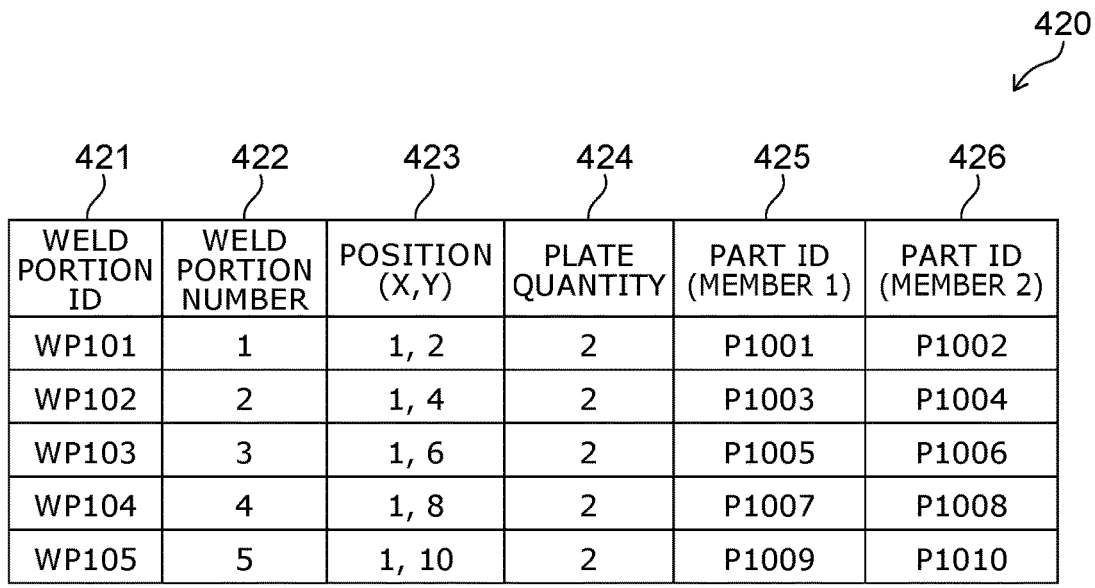
FIG. 6 is a table illustrating weld portion data.
Figure 7:
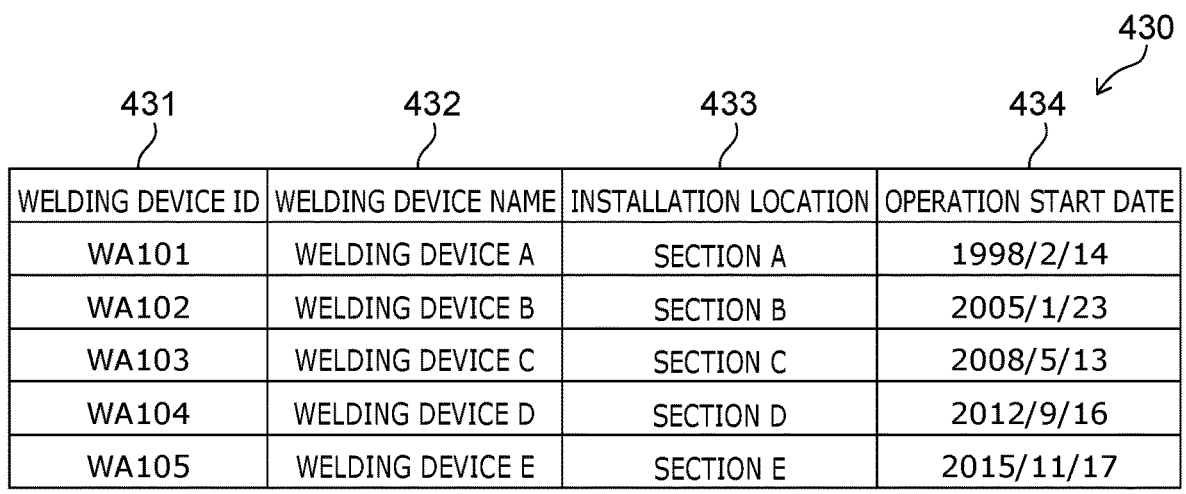
FIG. 7 is a table illustrating welding device data.
Figure 8:
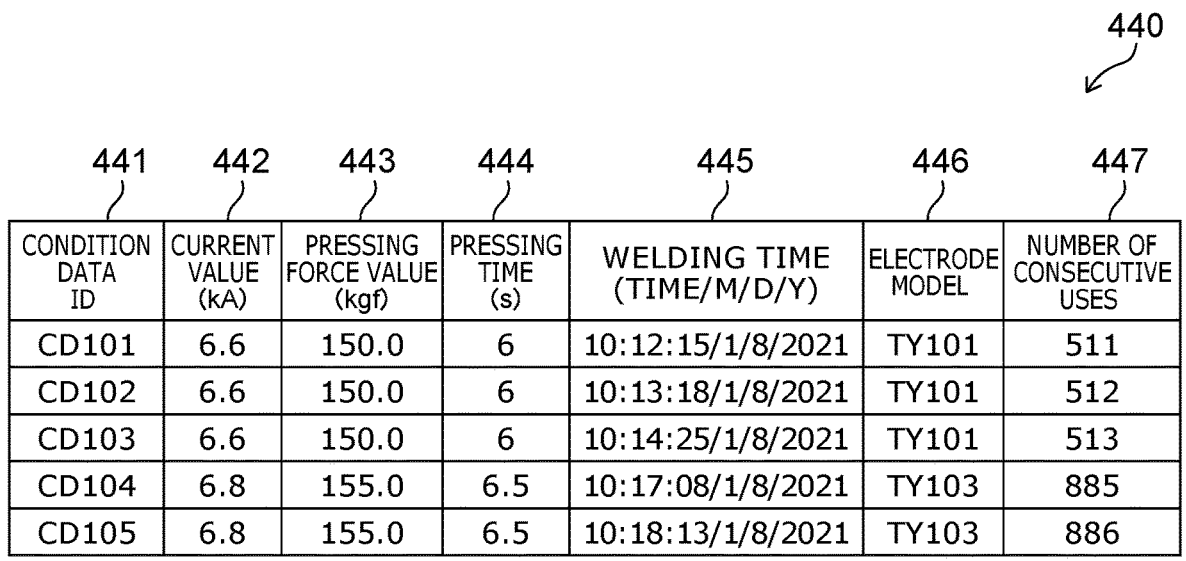
FIG. 8 is a table illustrating welding condition data.

FIG. 5 is a table illustrating part data. FIG. 6 is a table illustrating weld portion data. FIG. 7 is a table illustrating welding device data. FIG. 8 is a table illustrating welding condition data.

The part data is information of the parts to be joined. As shown in FIG. 5, the part data 410 includes a part ID 411, a part name 412, a product type 413, a material 414, and a thickness 415. The part ID 411 is a unique character string for identifying the part. The part name 412 is the name of the part. The product type 413 is the type of the part. The material 414 is the material of the part. The thickness 415 is the thickness of the part.

The weld portion data is information of the weld portions 330. As shown in FIG. 6, the weld portion data 420 includes a weld portion ID 421, a weld portion number 422, a position 423, a plate quantity 424, a part ID 425, and a part ID 426. The weld portion ID 421 is a unique character string for identifying the weld portion. For example, multiple weld portions 330 are formed in one joined body 300. The weld portion ID 421 is registered for each weld portion 330. The weld portion number 422 is a number for identifying each weld portion 330 in one joined body 300. If the types of the joined bodies 300 are the same, the weld portions 330 at the same positions are labeled with the same numbers between the joined bodies 300. The position 423 is the position at which the weld portion 330 is formed. The plate quantity 424 is the number of parts (metal plates) joined at the weld portion. The part IDs 425 and 426 are respectively the ID of a first part and the ID of a second part. In the example, one joined body 300 includes two parts. When one joined body 300 includes three or more parts, the number of the part IDs registered also increases according to the number of parts.

The welding device data is information of the welding devices. As shown in FIG. 7, the welding device data 430 includes a welding device ID 431, a welding device name 432, an installation location 433, and an operation start date 434. The welding device ID 431 is a unique character string for identifying the welding device. The welding device name 432 is the name of the device. The installation location 433 is the location at which the device is installed. The operation start date 434 is the time at which the device started to operate. The operation start date 434 is the time at which the device initially started to operate, and is not the operation restart time after device idling due to production line stoppage or the operation restart time after maintenance.

The welding condition data is conditions when performing welding. As shown in FIG. 8, the welding condition data 440 includes a condition data ID 441, a current value 442, a pressing force value 443, a pressing time 444, a welding time 445, an electrode model 446, and a number of consecutive uses 447. The condition data ID 441 is a unique character string for identifying each welding process to be performed. The current value 442 and the pressing force value 443 correspond to the current value V1 and the pressing force value V2 shown in FIG. 4. The pressing time 444 corresponds to the pressing time T2 shown in FIG. 4. The welding time 445 is the time at which the welding is performed. The model 446 is the unique model number for each electrode type. The diameter, total length, material, precision (tolerance), etc., of the electrode can be confirmed by identifying the model. The number of consecutive uses 447 is the number of times that the electrode is consecutively used after replacing or grinding.

Figure 9:
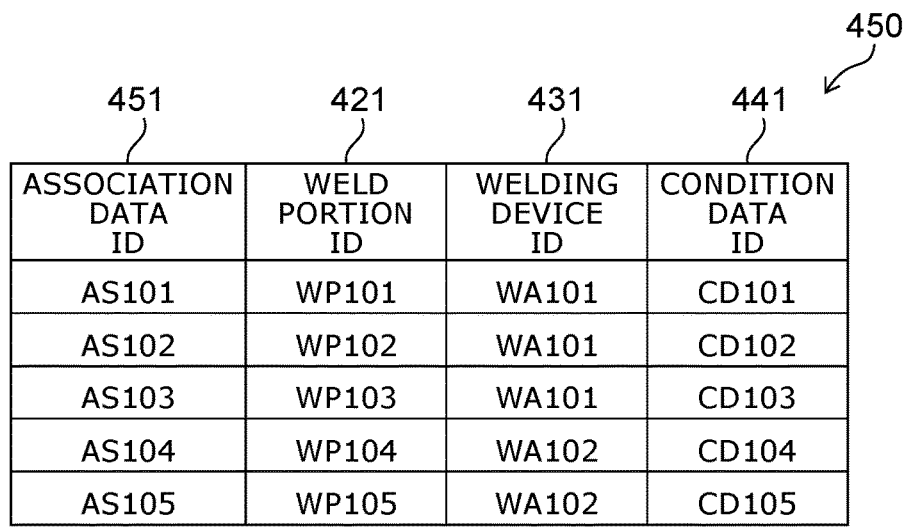
FIG. 9 is a table illustrating association data.

FIG. 9 is a table illustrating association data.

As described above, the data processing device 10 associates the weld portion data, the welding condition data, and the welding device data with each other. Also, the weld portion data is associated with the part data. The welding condition data and the welding device data are associated with the part data via the weld portion data. The association data is the association between the weld portion data, the welding condition data, and the welding device data. As shown in FIG. 9, the association data 450 includes association data ID 451, the weld portion ID 421, the welding device ID 431, and the condition data ID 441. The association data ID 451 is a unique character string assigned to the combination of the weld portion ID 421, the welding device ID 431, and the condition data ID 441.

By referring to the weld portion data and the association data, the data processing device 10 can retrieve other associated data based on one of the part data, the weld portion data, the welding device data, or the welding condition data.

A specific example of the inspection device 200 and various data obtained by the inspection device 200 will now be described.

Inspection Device

Figure 10:
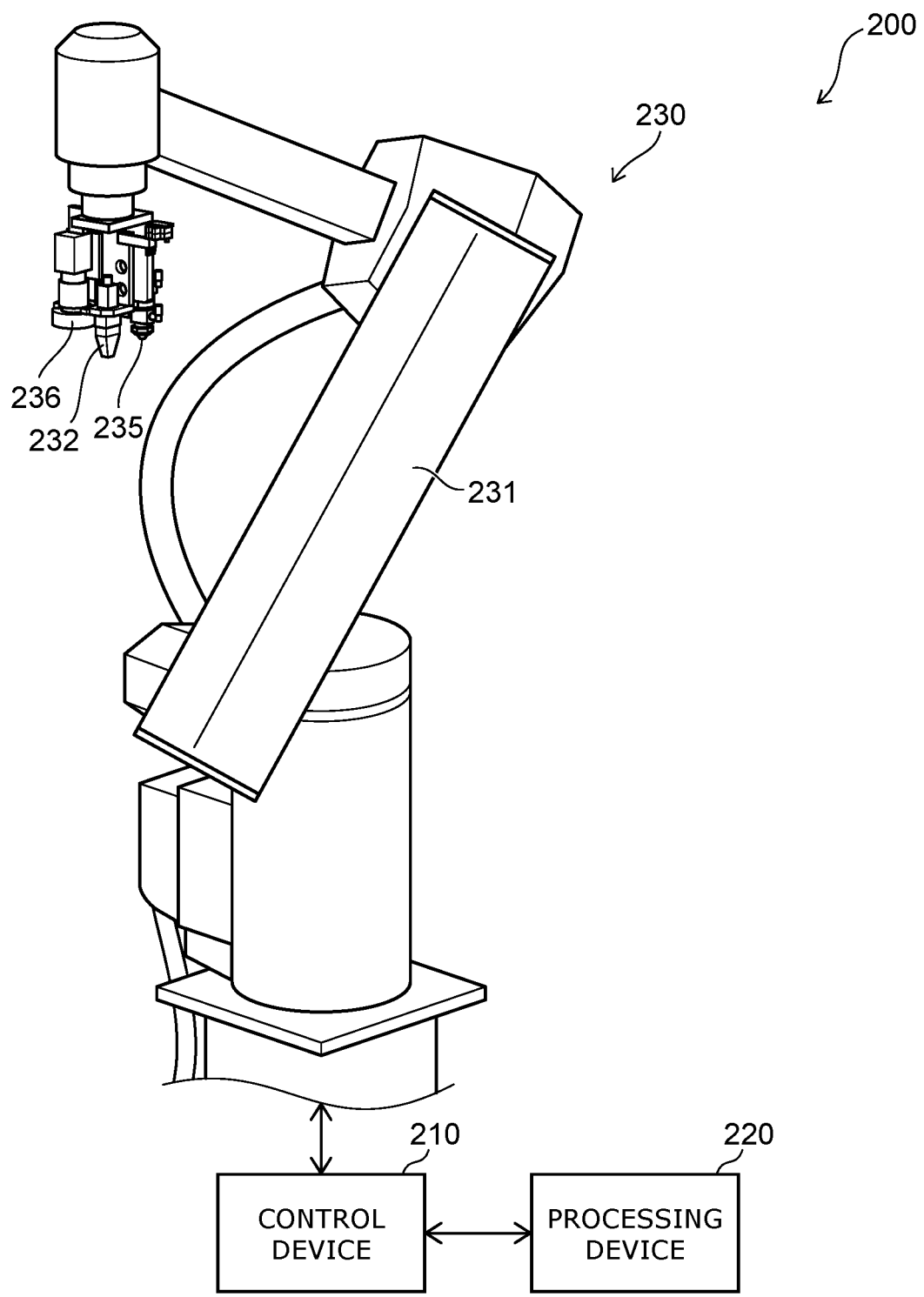
FIG. 10 is a schematic view illustrating the inspection device.

FIG. 10 is a schematic view illustrating the inspection device.

As shown in FIG. 10, the inspection device 200 includes a control device 210, a processing device 220, and a robot 230.

The control device 210 controls operations of the robot 230. The control device 210 is a so-called robot controller. The control device 210 includes a control circuit, a servo controller, a power supply device, etc. The control device 210 controls operations of the robot 230 by controlling servo motors of each axis according to a prestored operation program.

The robot 230 includes a manipulator 231, and a detector 232 mounted to the manipulator 231. For example, the manipulator 231 is vertical articulated. The detector 232 is located at the distal end of the manipulator 231 as an end effector. The manipulator 231 may be horizontal articulated or parallel link. The manipulator 231 may include a combination of two or more selected from vertical articulated, horizontal articulated, and parallel link. It is favorable for the manipulator 231 to have not less than six degrees of freedom.

The detector 232 performs a probe (probing) of the object. The probe includes transmitting an ultrasonic wave toward the object and detecting (receiving) a reflected wave. The detector 232 acquires intensity data of the intensity of the reflected wave by the probe. The detector 232 transmits the intensity data to the processing device 220.

In the example of FIG. 10, a dispenser 235 and an imager 236 also are included as end effectors. The dispenser 235 dispenses a couplant liquid toward the surface of the object. The imager 236 acquires an image by imaging the weld portion 330. The processing device 220 calculates the position of the external appearance of the weld portion 330 based on the obtained image.

Figure 11:
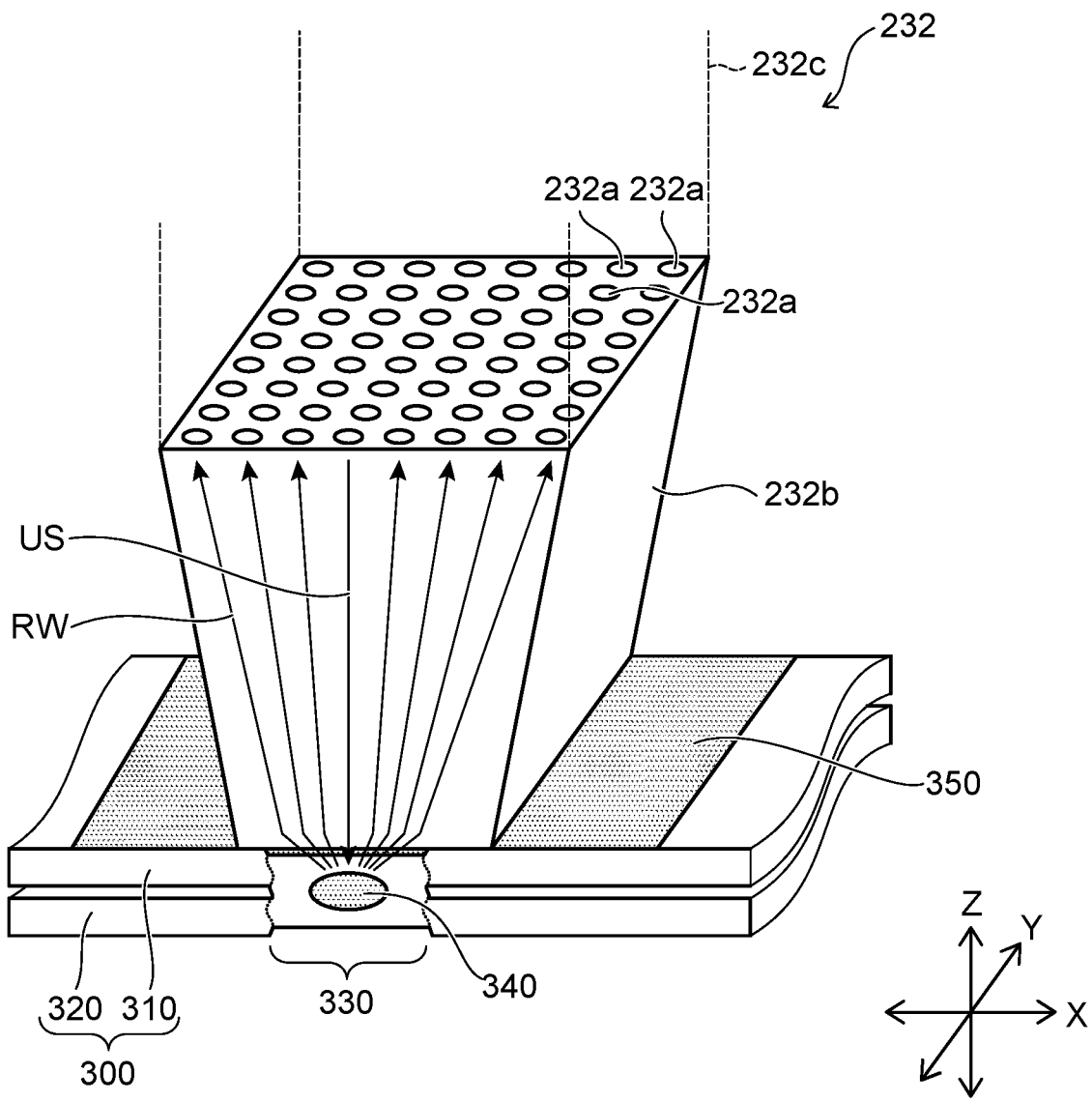
FIG. 11 is a schematic view showing the structure of the detector and the joined body.

FIG. 11 is a schematic view showing the structure of the detector and the joined body.

In the example of FIG. 11, the object of the probe by the detector 232 is the joined body 300. The joined body 300 includes the metal plates 310 and 320. The metal plate 310 and the metal plate 320 are joined at the weld portion 330. In other words, a boundary between the metal plate 310 and the metal plate 320 does not exist at the weld portion 330. A solidified portion 340 that is formed by mixing the melted metal exists at the weld portion 330. The weld portion 330 is formed by resistance spot welding.

As shown in FIG. 11, the detector 232 includes detection elements 232a, a propagating part 232b, and a housing 232c.

The detection elements 232a are arranged along an X-direction and a Y-direction. The X-direction and the Y-direction cross each other. In the example, the Y-direction is perpendicular to the X-direction. For example, the detection element 232a is a transducer that emits an ultrasonic wave of a frequency of not less than 1 MHz and not more than 100 MHz. The detection element 232a transmits the ultrasonic wave along a Z-direction. The Z-direction is perpendicular to the X-Y plane.

The multiple detection elements 232a are located at the distal end of the housing 232c and are covered with the propagating part 232b. The propagating part 232b is positioned between the joined body 300 and the detection elements 232a when the detector 232 is caused to contact the joined body 300. When the detection element 232a emits an ultrasonic wave, the ultrasonic wave propagates through the propagating part 232b and is transmitted outside the detector 232. When the ultrasonic wave is reflected, the reflected wave propagates through the propagating part 232b and reaches the detection elements 232a.

The detection elements 232a detect the reflected wave. The intensity of the signal detected by the detection elements 232a corresponds to the intensity of the reflected wave. The detector 232 acquires signals (intensity data) indicating the reflected wave intensity and transmits the signals to the processing device 220.

The propagating part 232b includes a resin material or the like through which the ultrasonic wave easily propagates. Deformation, damage, and the like of the detection elements 232a can be suppressed by the propagating part 232b when the detector 232 contacts the weld portion 330. The propagating part 232b has a hardness sufficient to suppress the deformation, damage, and the like when contacting the weld portion 330.

A couplant liquid 350 is coated onto the surface of the joined body 300 so that the ultrasonic wave easily propagates between the detector 232 and the joined body 300 when probing. Each detection element 232a transmits an ultrasonic wave US toward the joined body 300 on which the couplant liquid 350 is coated.

For example, as shown in FIG. 11, one detection element 232a transmits the ultrasonic wave US toward the joined body 300. A portion of the ultrasonic wave US is reflected by the upper surface, lower surface, or the like of the joined body 300. The multiple detection elements 232a each detect a reflected wave RW. In the probe, each detection element 232a sequentially transmits the ultrasonic wave US; and each reflected wave RW is detected by the multiple detection elements 232a.

The processing device 220 processes the intensity data and calculates inspection values related to the weld portion 330. The inspection values include at least one selected from the center position, the angle, the thickness, the depth of the recess, and the diameter of the weld portion 330. The processing device 220 generates inspection data that includes the inspection values. The inspection data may include the determination result of the goodness of the weld portion 330.

FIGS. 12A to 12C are schematic views for describing operations of the inspection device according to the embodiment.

As shown in FIG. 12A, the ultrasonic wave US is reflected by the surface of the propagating part 232b, an upper surface 311 and a lower surface 312 of the metal plate 310, and an upper surface 331 and a lower surface 332 of the weld portion 330.

The Z-direction positions of the surface of the propagating part 232b, the upper surface 311, the upper surface 331, the lower surface 312, and the lower surface 332 are different from each other. In other words, the distances in the Z-direction between the detection element 232a and these surfaces are different from each other. The detection element 232a detects the peaks of the reflected wave intensities when detecting the reflected waves from these surfaces. Which surface reflected the ultrasonic wave US can be discriminated by calculating the time until each peak is detected after transmitting the ultrasonic wave US.

FIGS. 12B and 12C are graphs illustrating the relationship between the time after transmitting the ultrasonic wave US and the intensity of the reflected wave RW at one point in the X-Y plane. In FIGS. 12B and 12C, the horizontal axis is the intensity of the detected reflected wave RW. The vertical axis is the elapsed time after transmitting the ultrasonic wave US. The time corresponds to the Z-direction position. The graph of FIG. 12B illustrates a detection result of the reflected waves RW from the surface of the propagating part 232b, the upper surface 311, and the lower surface 312. In other words, the graph of FIG. 12B illustrates the detection result of the reflected waves RW from a point that is not joined. The graph of FIG. 12C illustrates the detection result of the reflected waves RW from the surface of the propagating part 232b, the upper surface 331, and the lower surface 332. In other words, the graph of FIG. 12C illustrates the detection result of the reflected waves RW from a point that is joined.

In the graphs of FIGS. 12B and 12C, a peak Pe10 is based on the reflected wave RW from the surface of the propagating part 232b. A peak Pe11 is based on the reflected wave RW from the upper surface 311. A peak Pe12 is based on the reflected wave RW from the lower surface 312. The times from the transmission of the ultrasonic wave US until the peak Pe11 and the peak Pe12 are detected correspond respectively to the Z-direction positions of the upper surface 311 and the lower surface 312.

Similarly, a peak Pe13 is based on the reflected wave RW from the upper surface 331. A peak Pe14 is based on the reflected wave RW from the lower surface 332. The times from the transmission of the ultrasonic wave US until the peak Pe13 and the peak Pe14 are detected correspond respectively to the Z-direction positions of the upper surface 331 and the lower surface 332.

The processing device 220 determines whether or not the peak Pe12 exists in the Z-direction reflected wave intensity distribution at points in the X-Y plane. Specifically, the processing device 220 detects a peak in a range in the Z-direction in which the peak Pe12 may be detected. The processing device 220 compares the peak intensity to a threshold. The threshold and the range in the Z-direction are preset.

When the peak intensity is greater than the threshold, the processing device 220 determines that the peak is the peak Pe12. The existence of the peak Pe12 indicates that the lower surface 312 exists at the point and that the metal plate 310 and the metal plate 320 are not joined. The processing device 220 determines that points at which the peak Pe12 is detected are not joined. The processing device 220 determines that points at which the peak Pe12 is not detected are joined. The processing device 220 sequentially determines whether or not each of multiple points in the X-Y plane are joined. The processing device 220 identifies a cluster of points determined to be joined as the weld portion 330.

The processing device 220 may generate an image by using the intensity data obtained by the probe.

FIG. 13 is an example of an image of a three-dimensional reflected wave intensity distribution.

In the probe as described above, each detection element 232a sequentially transmits an ultrasonic wave; and each reflected wave is detected by the multiple detection elements 232a. In the specific example shown in FIG. 11, 8×8, i.e., sixty-four detection elements 232a are provided. In such a case, the sixty-four detection elements 232a sequentially transmit ultrasonic waves. One detection element 232a repeatedly detects the reflected wave 64 times. The detection result of the Z-direction reflected wave intensity distribution is output 64 times from one detection element 232a. The intensity distribution of the sixty-four reflected waves output from the one detection element 232a are summed. The summed intensity distribution is used as the intensity distribution at the coordinate at which the one detection element 232a is located in one probe. Similar processing is performed for the detection results of the sixty-four detection elements 232a. Aperture synthesis may be performed to increase the resolution in the X-direction and the Y-direction of the detection results of the detection elements 232a. Thus, the reflected wave intensity distribution in the Z-direction is generated at each of multiple points in the X-Y plane. In other words, three-dimensional intensity data that includes the reflected wave intensity at points in the X-direction, the Y-direction, and the Z-direction is obtained.

The image of FIG. 13 shows the weld portion 330 vicinity based on the three-dimensional intensity data. In FIG. 13, portions at which the luminance is high are portions at which the reflected wave intensity of the ultrasonic wave is relatively large. In the example of FIG. 13, reflected waves from the upper surface and the lower surface of the weld portion 330 and reflected waves of multiple reflections between the upper surface and the lower surface appear.

Figure 14A:
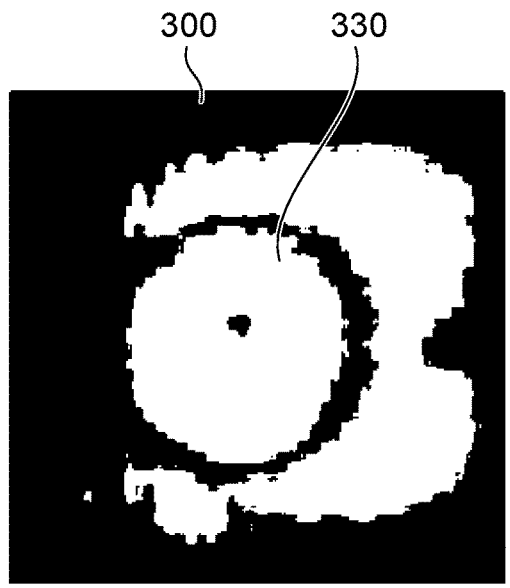
FIGS. 14A to 14C are examples of images of the two-dimensional reflected wave intensity distribution.
Figure 14B:
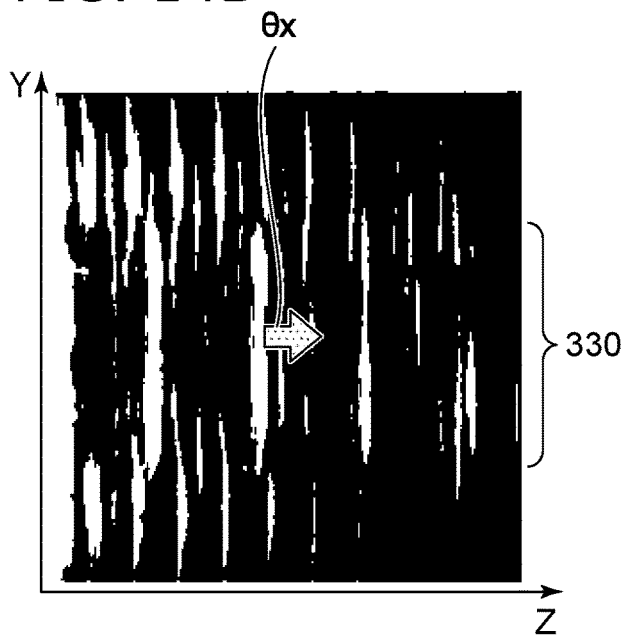
Figure 14C:
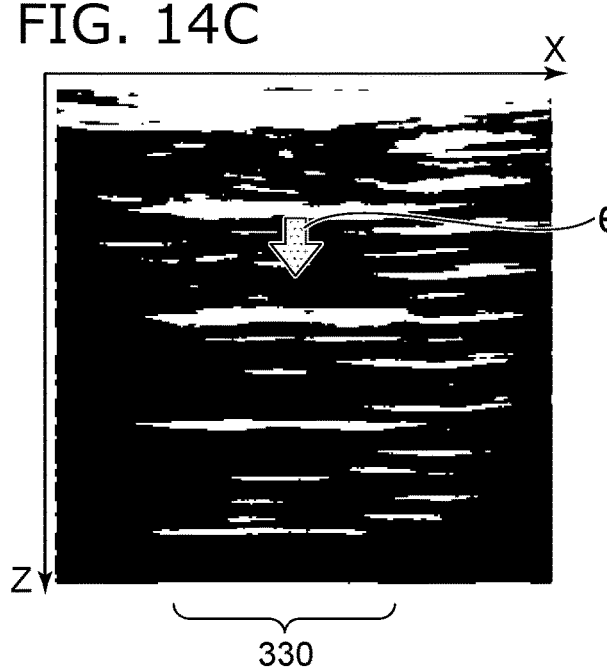

FIGS. 14A to 14C are examples of images of the two-dimensional reflected wave intensity distribution.

The processing device 220 may acquire the data shown in FIGS. 14A to 14C by processing the intensity data. FIG. 14A shows the reflected wave intensity distribution in the X-Y plane at the weld portion 330 vicinity. FIG. 14B shows the reflected wave intensity distribution in the Y-Z plane at the weld portion 330 vicinity. FIG. 14C shows the reflected wave intensity distribution in the X-Z plane at the weld portion 330 vicinity.

The data of FIG. 14A is obtained by summing the intensity in the Z-direction at each point in the X-Y plane. The data of FIG. 14B is obtained by summing the intensity in the X-direction at each point in the Z-direction. The data of FIG. 14C is obtained by summing the intensity in the Y-direction at each point in the Z-direction. FIGS. 14A to 14C show the schematically binarized intensities of the reflected waves. The white points indicate that the intensity of the reflected wave is relatively high at those points. The black points indicate that the intensity of the reflected wave is relatively low at those points.

Figure 15:
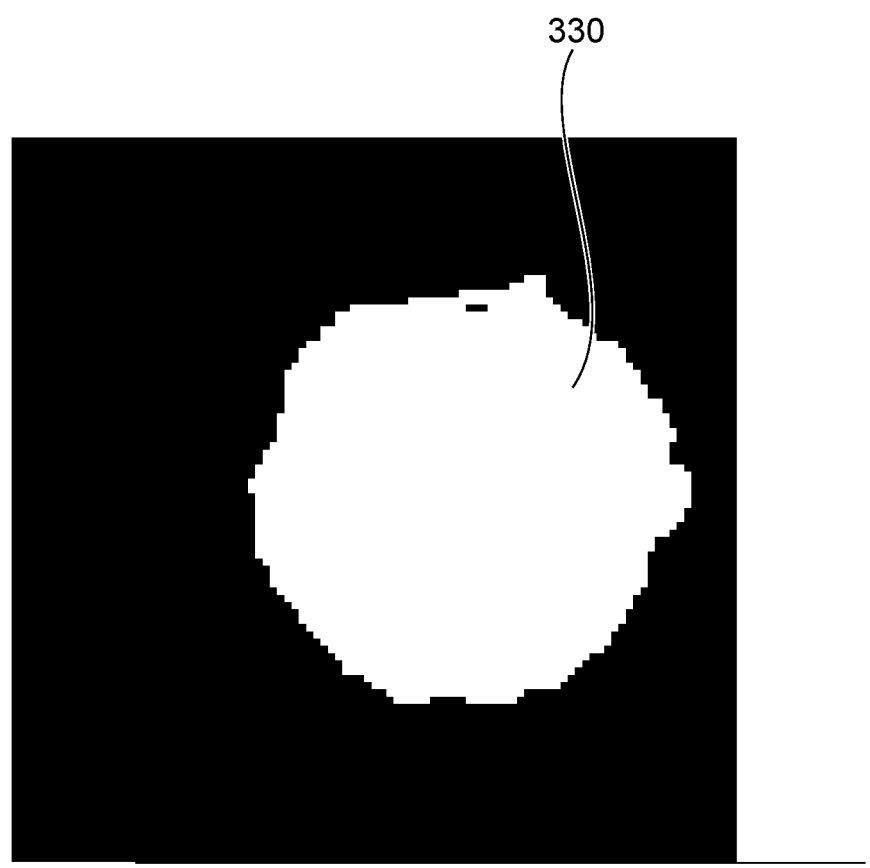
FIG. 15 is an example of an image of an identified weld portion.

FIG. 15 is an example of an image of an identified weld portion.

FIG. 15 shows the result of a determination of a joint or non-joint at each point in the X-Y plane. The ranges in the X-direction and the Y-direction of the region in which the determination of the joint or non-joint is performed correspond to the range in the X-direction and the Y-direction in which the intensity data is obtained. As an example, the range in the X-direction and the range in the Y-direction of the two-dimensional data shown in FIG. 15 correspond respectively to the range in the X-direction and the range in the Y-direction of the three-dimensional intensity data shown in FIG. 13. A portion of the ranges in the X-direction and the Y-direction in which the intensity data is obtained may be extracted, and the determination of the joint or non-joint may be performed for the extracted region. The determination is performed at each point of the intensity data in the X-Y plane. In FIG. 15, the points that are determined to be joined based on the intensity data are illustrated using white. The points that are determined not to be joined are illustrated using black. A cluster of points determined to be joined corresponds to the weld portion 330. The processing device 220 generates the image shown in FIG. 15 by using the determination result of the joints at each point.

The processing device 220 also may calculate at least one selected from the center position, the angle, the thickness, the depth of the recess, and the diameter of the weld portion 330 in the inspection. The method for calculating each value will now be described.

Position

The processing device 220 calculates the centroid position of the intensity as the position of the weld portion 330 for the reflected wave intensity distribution in the X-Y plane shown in FIG. 14A. For example, as shown in FIG. 14A, the luminous centroid position of the binarized image may be calculated. Or, the luminous centroid position may be calculated for an image in which each pixel has a pixel value of one of three or more levels (e.g., 0 to 255).

Or, the processing device 220 may calculate the centroid position by extracting the reflected wave component from the weld portion 330 in the Z-direction. For example, as shown in FIGS. 14B and 14C, the period at which the reflected wave from the weld portion 330 is detected is different from the period at which the reflected waves from other portions are detected. The processing device 220 filters the intensity distribution in the Z-direction by using a preset thickness of the weld portion 330. Thereby, the processing device 220 extracts the reflected wave component from the weld portion 330. The processing device 220 calculates the centroid position of the intensity distribution in the X-Y plane after filtering as the position of the weld portion 330.

Or, as shown in FIG. 15, the processing device 220 may identify the weld portion 330 and calculate the centroid position in the X-Y plane of the weld portion 330 as the position of the weld portion 330. As described above, the weld portion 330 can be identified by determining the joint or non-joint at each point in the X-Y plane. The processing device 220 may calculate the center of a circle that inscribes or circumscribes the identified weld portion 330 in the X-Y plane as the position of the weld portion 330.

The weld portion 330 that is formed by resistance spot welding is generally circular. The processing device 220 may use the position calculated by any of the following methods as the position of the weld portion 330. In a first method, the processing device 220 generates an approximate circle of the weld portion 330 by the least squares method and calculates the position of the approximate circle. In a second method, the processing device 220 generates a maximum inscribed circle that inscribes the outer edge of the weld portion 330, and calculates the position of the inscribed circle. In a third method, the processing device 220 generates a minimum circumscribed circle that circumscribes the outer edge of the weld portion 330, and calculates the position of the circumscribed circle. In a fourth method, the processing device 220 calculates the positions of an inscribed circle and a circumscribed circle to minimize the radius difference.

Angle

Figure 16:
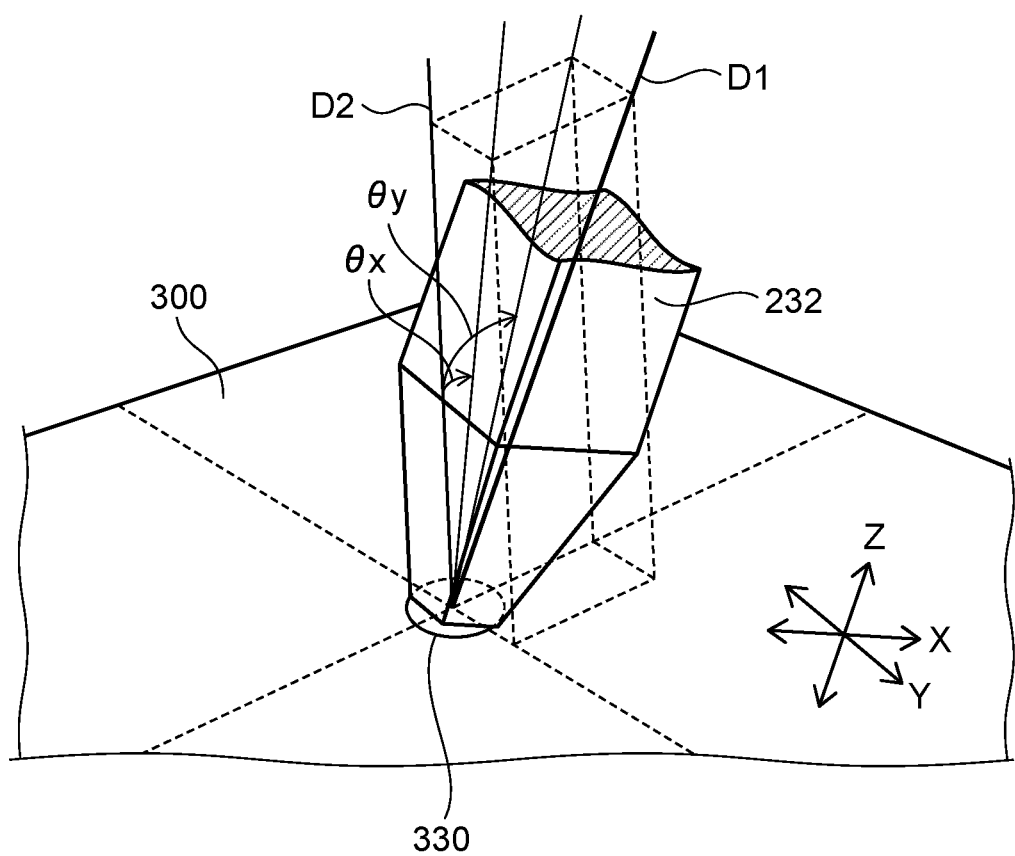
FIG. 16 is a schematic view showing the detector.

FIG. 16 is a schematic view showing the detector.

For example, the angle of the weld portion 330 corresponds to the angle between a normal direction D2 of the upper surface of the weld portion 330 shown in FIG. 16 and a direction D1 of the detector 232. The direction D1 is perpendicular to the arrangement direction of the multiple detection elements 232a. The angle is represented by an angle θx around the X-direction and an angle θy around the Y-direction between the directions D1 and D2. In other words, the angle of the weld portion 330 is the tilt of the upper surface of the weld portion 330 with respect to the arrangement direction of the multiple detection elements 232a.

As shown in FIG. 14B, the angle θx is calculated based on the detection result in the Y-Z plane. As shown in FIG. 14C, the angle θy is calculated based on the detection result in the X-Z plane. Specifically, the processing device 220 calculates the average of the three-dimensional luminance gradients. The processing device 220 uses the average of the gradients around the X-direction as the angle θx. The processing device 220 uses the average of the gradients around the Y-direction as the angle θy.

Herein, data that represents the position of the center of the weld portion 330 is called position data. Data that represents the angle of the weld portion 330 is called angle data.

Thickness, Recess Depth, and Diameter

The thickness of the weld portion 330 is the distance in the Z-direction between the upper surface 331 and the lower surface 332. The thickness of the weld portion 330 can be calculated based on the time difference between the peaks Pe13 and Pe14. The depth of the recess of the weld portion 330 is the distance in the Z-direction between the upper surfaces 311 and 331. The depth of the recess of the weld portion 330 can be calculated based on the time difference between the peaks Pe11 and Pe13. The diameter is the length of the weld portion 330 in any one direction parallel to the X-Y plane. The major diameter or the minor diameter may be used as the diameter. The major diameter is the distance between two points most separated among multiple points on the outer edge of the weld portion 330. The minor diameter is the length of the weld portion 330 in a direction that is perpendicular to the line segment connecting these two points and passes through the center between these two points.

Goodness Determination

The processing device 220 compares the diameter to a preset threshold. When the diameter is greater than the threshold, the processing device 220 determines that the weld portion 330 is good. When the diameter is not more than the threshold, the processing device 220 determines that the weld portion 330 is defective. The diameter that is compared to the threshold is the major diameter or the minor diameter of the weld portion 330.

In the examples of FIGS. 12B and 12C described above, the intensity of the reflected wave RW is expressed as an absolute value. The intensity of the reflected wave may be expressed in any form. For example, the reflected wave intensity that is output from the detection element 232a includes positive values and negative values according to the phase. Various processing may be performed based on the reflected wave intensity including the positive values and the negative values. The reflected wave intensity that includes the positive values and the negative values may be converted into absolute values. The average value of the reflected wave intensities may be subtracted from the reflected wave intensity at each time. Or, the weighted average value, the weighted moving average value, etc., of the reflected wave intensities may be subtracted from the reflected wave intensity at each time. Filtering may be performed to extract only a frequency component of a specific period. The various processing described in the application can be performed even when the results of such processing applied to the reflected wave intensity are used.

The inspection data based on the probe result is obtained by the processing described above. When the inspection is performed, the data processing device 10 or the control device 150 identifies the inspected joined body based on various sensors, the operation logs of the transfer devices, etc. When the inspection device 200 inspects the joined body, the processing device 220 transmits the inspection data to the data processing device 10. The inspection data may be transmitted to the data processing device 10 via a higher-level processing device that manages the multiple inspection devices 200. The data processing device 10 associates the inspection data with other data that includes the welding device data.

FIG. 17 is a table illustrating inspection data.

As shown in FIG. 17, the inspection data 460 includes an inspection data ID 461, an inspection device ID 462, an image data ID 463, a position 464a, an apparent position 464b, an angle 465, a thickness 466a, a recess depth 466b, a diameter 467, a determination result 468, and an inspection time 469.

The inspection data ID 461 is a unique character string for identifying the inspection data. The inspection device ID 462 is a unique character string for identifying the inspection device that acquired the inspection data. The image data ID 463 is the ID of the image data obtained in the inspection. The image data is, for example, at least one selected from the image of the three-dimensional intensity distribution shown in FIG. 13, the image of the determination result of the joint shown in FIG. 14A, the image of the two-dimensional intensity distribution shown in FIG. 14B or FIG. 14C, and the image of the weld portion shown in FIG. 15.

The position 464a is the position of the center of the weld portion 330 calculated from the intensity data. The position 464a may be represented using a predesigned position of the weld portion 330 as the origin. The apparent position 464b is the position of the weld portion 330 calculated from an image obtained by the imager 236. The angle 465 is the angle of the weld portion 330. The thickness 466a is the thickness of the weld portion 330. The depth 466b is the depth of the recess of the upper surface of the weld portion 330. The diameter 467 is the diameter of the weld portion 330. The determination result 468 is the determination result of the goodness of the weld portion 330. The inspection time 469 is the time at which the inspection was performed.

When the weld portion 330 is inspected, the inspection device 200 transmits the inspection data to the data processing device 10. The data processing device 10 associates the inspection data with the part data, the welding device data, the welding condition data, and the weld portion data. The data processing device 10 stores the associated data in the memory device 20.

FIG. 18 is a table illustrating association data.

The association data 450a shown in FIG. 18 is the association data 450 shown in FIG. 9 that is also associated with an inspection data ID 452. Thereby, the part data, the welding device data, the welding condition data, the weld portion data, and the inspection data are associated with each other. The inspection data may be associated with the welding device data, the welding condition data, and the weld portion data via the part data without being directly associated with the welding device data, the welding condition data, and the weld portion data.

Figure 19:
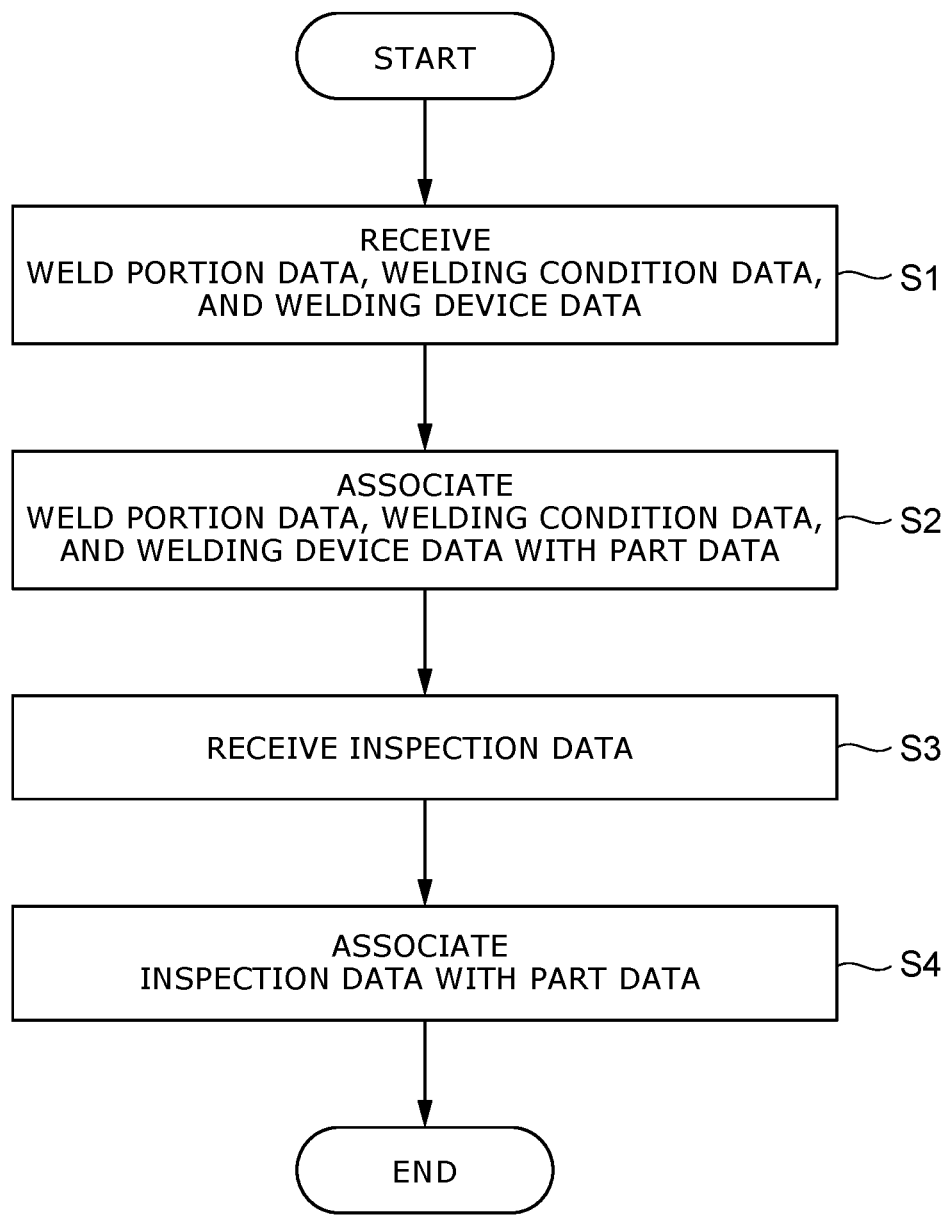
FIG. 19 is a flowchart showing processing by the data processing device according to the embodiment.

FIG. 19 is a flowchart showing processing by the data processing device according to the embodiment.

The data processing device 10 receives the weld portion data, the welding condition data, and the welding device data from the welding device 100 (step S1). The data processing device 10 associates the weld portion data, the welding condition data, and the welding device data with the part data (step S2). The data processing device 10 receives the inspection data (step S3). The data processing device 10 associates the inspection data with the part data (step S4).

Advantages of the embodiment will now be described.

The position data of the position of the weld portion 330, the angle data of the angle of the weld portion 330, etc., are obtained in the inspection of the weld portion 330. These data that are obtained from the inspection show that there is no abnormality in the weld portion 330. For example, the data shows that an abnormality exists in the weld portion 330 when the position of the position data deviates from the predesigned position of the weld portion 330 or when the angle of the angle data is large. An abnormality of the weld portion 330 indicates that an abnormality exists in the manufacturing line of the joined body 300. For example, a check or maintenance of the welding device 100 may be necessary.

When an abnormality of the weld portion 330 is found based on the inspection data, it is favorable to be able to easily find the part of the manufacturing line that is the cause. For example, it is favorable to be able to easily retrieve the welding device 100 that formed the weld portion 330. The data processing device 10 according to the embodiment associates the inspection data with the welding device data when receiving the inspection data. Therefore, when the abnormality of the weld portion 330 is found based on the inspection data, the welding device 100 that formed the weld portion 330 can be easily retrieved. According to the embodiment, the welding device data can be easily retrieved based on the inspection data; and the convenience of the data can be improved.

In particular, the position has a large effect on the quality of the joined body 300. When the position of the weld portion 330 greatly deviates from the design position, there is a possibility that the strength of the joined body 300 may be reduced from the designed strength. The position also can be calculated from an image of the weld portion 330. However, there is a possibility that the position of the weld portion 330 that can be confirmed by its appearance deviates from the position of the weld portion 330 that is actually joined. It is desirable to use the actual position of the weld portion 330 to inspect the reliability of the joined body 300 such as the strength, etc., with higher accuracy. The data processing device 10 associates the inspection data that includes the position of the weld portion 330 calculated from the probe result with the welding device data. According to the embodiment, more reliable data can be associated with the welding device data.

It is favorable for the data processing device 10 to include at least one of the following multiple functions to improve the convenience.

User Interface

FIGS. 20 to 28 are schematic views illustrating a user interface.

Figure 20:
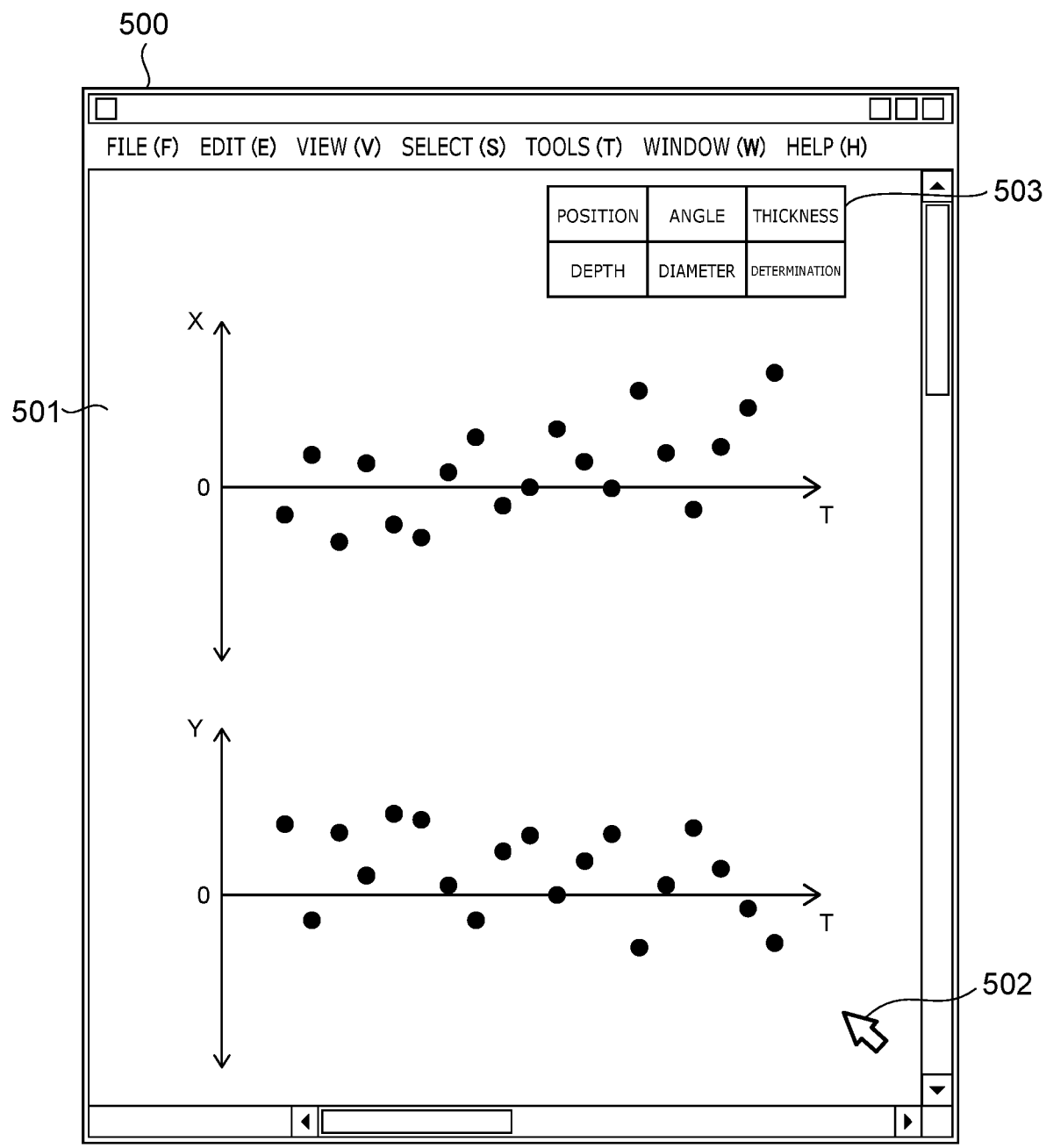
FIG. 20 is a schematic view illustrating a user interface.

The output device 30 is, for example, a monitor or a projector. The data processing device 10 causes the output device 30 to display a graphical user interface (UI). For example, the data processing device 10 causes the display of a window 500 as shown in FIG. 20 as the UI. The window 500 includes a display region 501.

Figure 21:
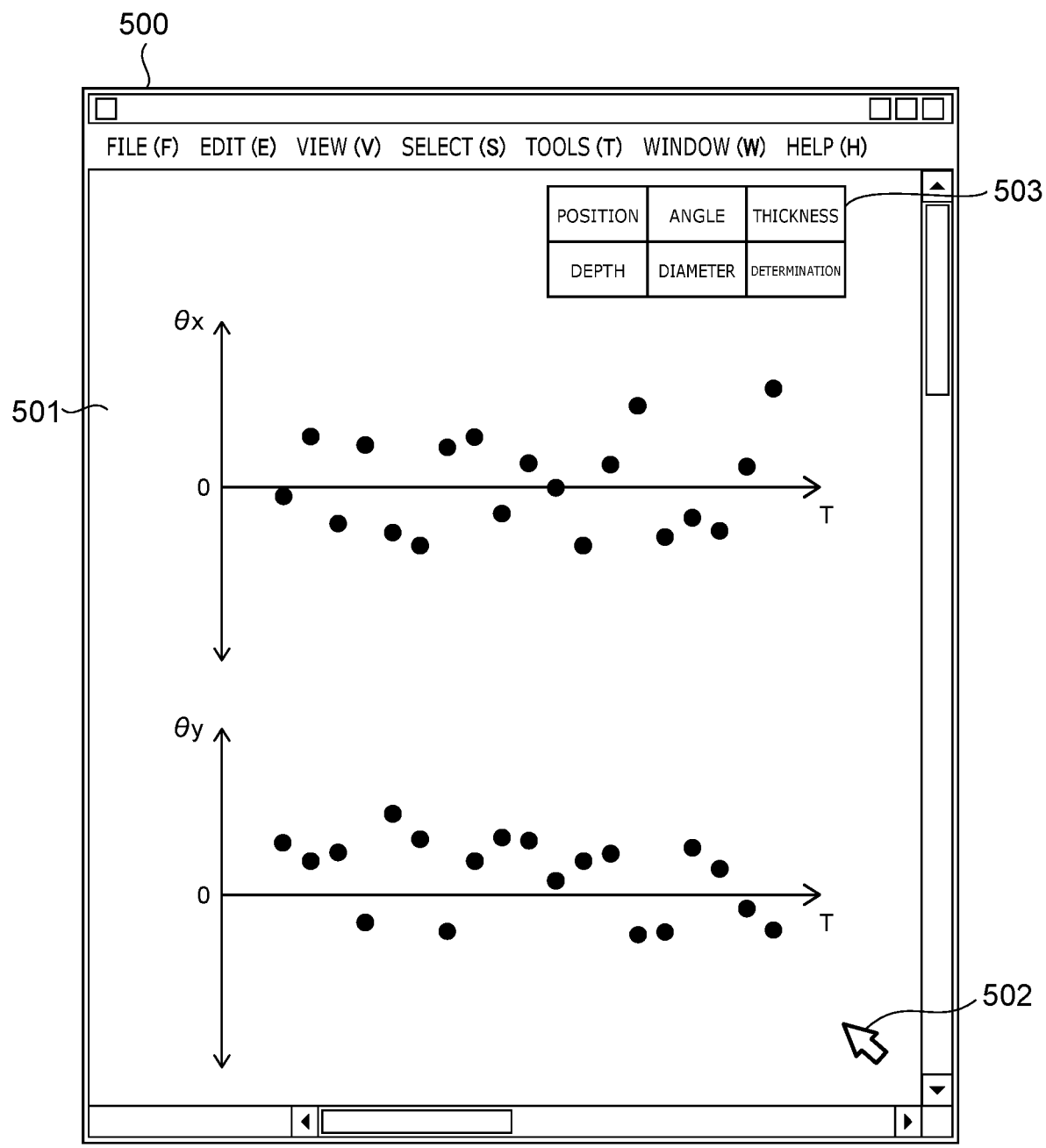
FIG. 21 is a schematic view illustrating a user interface.

The data processing device 10 refers to multiple sets of position data and multiple inspection times for multiple weld portions 330 having the same number in multiple joined bodies 300. As shown in FIG. 20, the data processing device 10 displays the change of the position of the weld portion 330 with respect to time in the display region 501. In the example of FIG. 20, the change of the position (X) in the X-direction with respect to time (T) and the change of the position (Y) in the Y-direction with respect to time (T) are displayed. Or, as shown in FIG. 21, the change of the angle around the X-direction (θx) with respect to time (T) and the change of the angle around the Y-direction (θy) with respect to time (T) may be displayed.

An icon group 503 may be displayed for selecting the data to be displayed. The icon group 503 includes "position", "angle", "thickness", "depth", "diameter", and "determination". The user can move a pointer 502 by operating the input device 40. When one of the icons is selected by the pointer 502, the data related to the selected icon is displayed. When the icon of "position", "angle", "thickness", "depth", "diameter", or "determination" is selected, the change of the position, the change of the angle, the change of the thickness, the change of the depth of the recess, the change of the diameter, or the change of the determination result of the goodness of the weld with respect to time is displayed.

Figure 22:
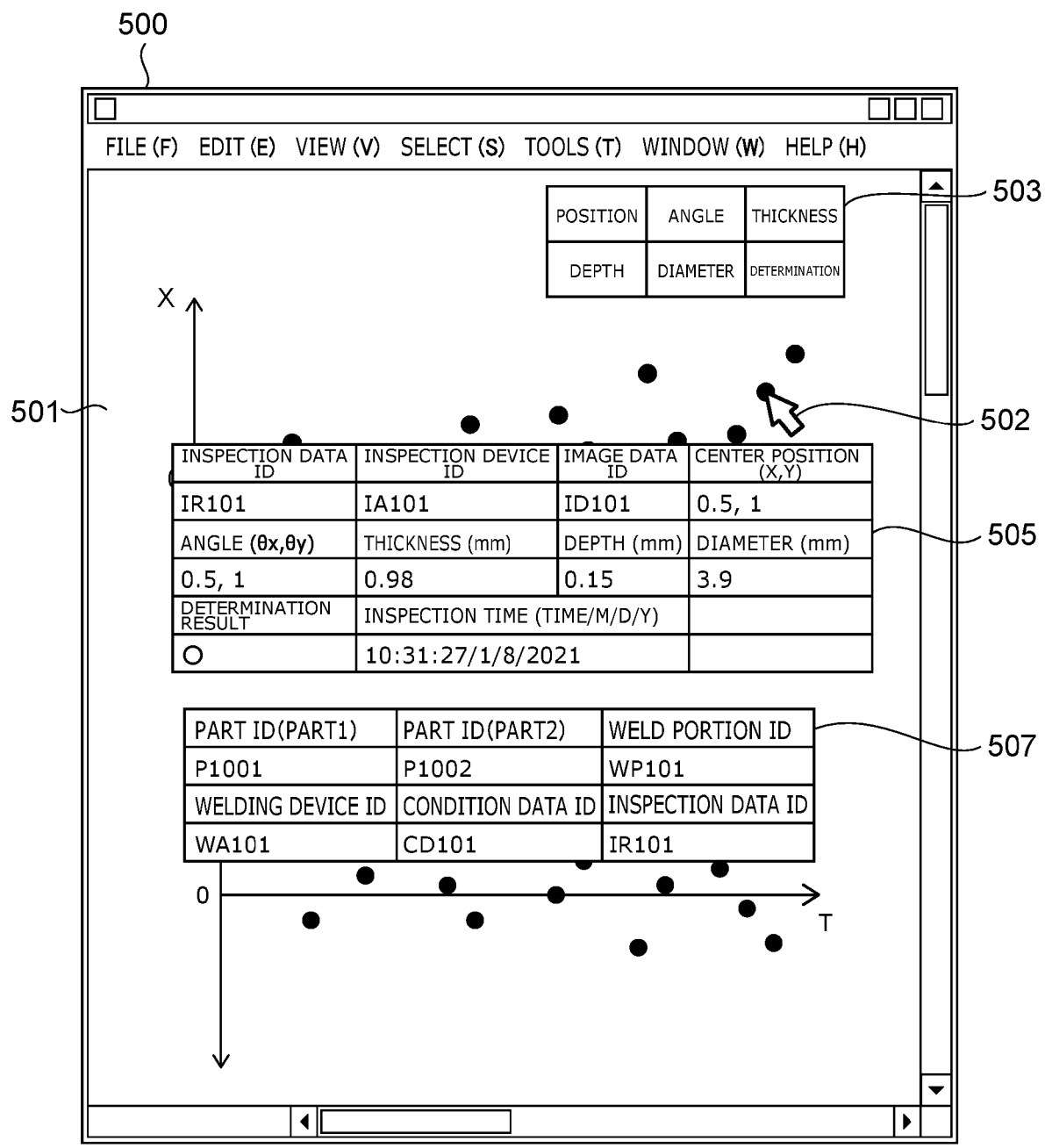
FIG. 22 is a schematic view illustrating a user interface.

Any of the inspection values obtained in the inspection may be selectable in the UI. For example, as shown in FIG. 22, the user uses the pointer 502 to select any of the inspection values. When accepting the selection of the inspection value, the data processing device 10 refers to the inspection data that includes the inspection value. The data processing device 10 displays a window 505 that shows the other data included in the inspection data. The data processing device 10 may display a window 507 showing at least one selected from the part data, the weld portion data, the welding condition data, and the welding device data associated with the inspection data. The data processing device 10 can similarly display the windows 505 and 507 when other data such as the angle, the thickness, etc., are selected.

Figure 23:
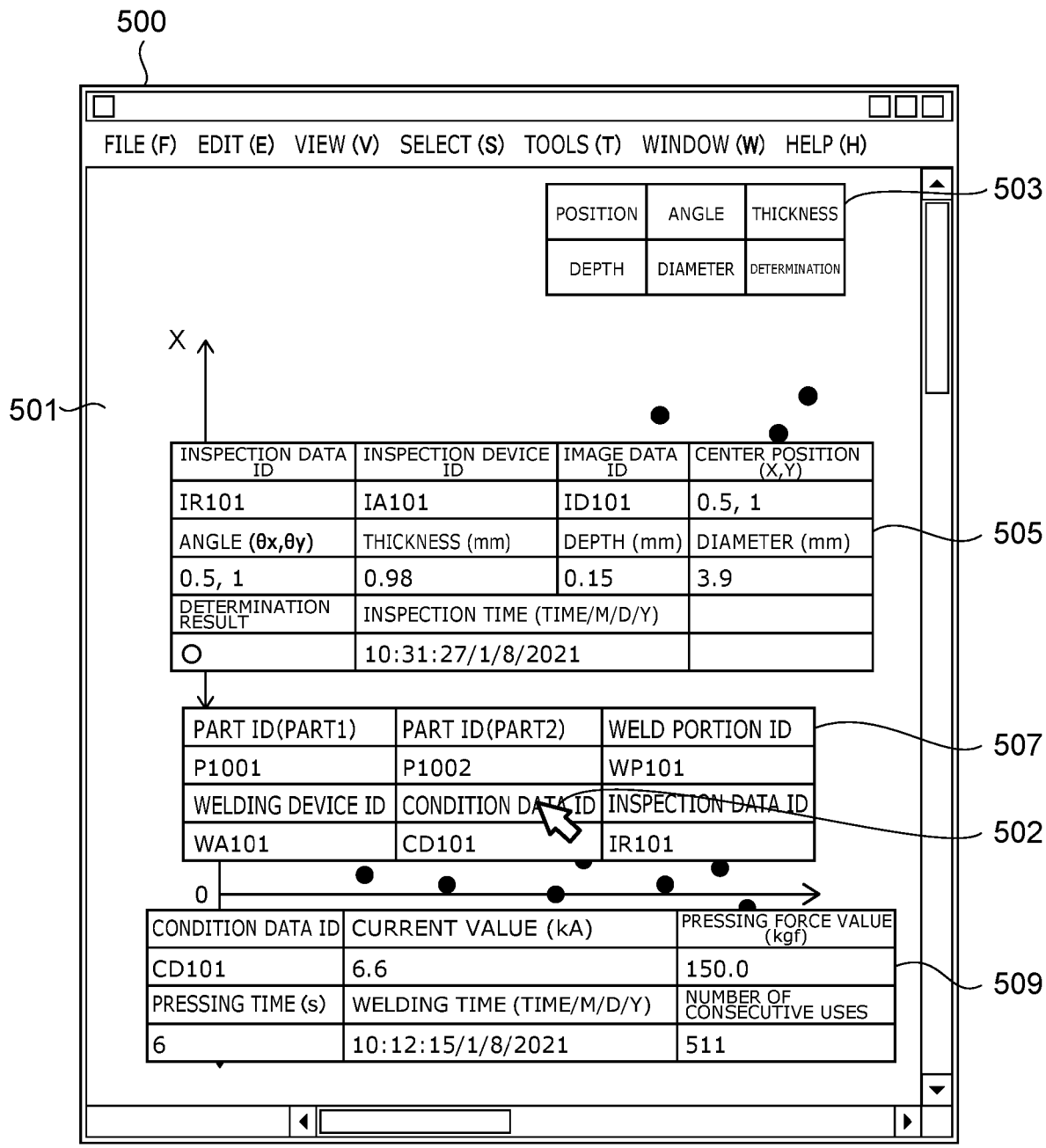
FIG. 23 is a schematic view illustrating a user interface.

The data processing device 10 may accept the selection of any data in the window 507. The data processing device 10 displays the details of the selected data as shown in FIGS. 5 to 8 and FIG. 17. In the example of FIG. 23, the condition data ID of the welding condition is selected in the window 507. The data processing device 10 displays a window 509 that shows the welding condition data corresponding to the condition data ID.

Figure 24:
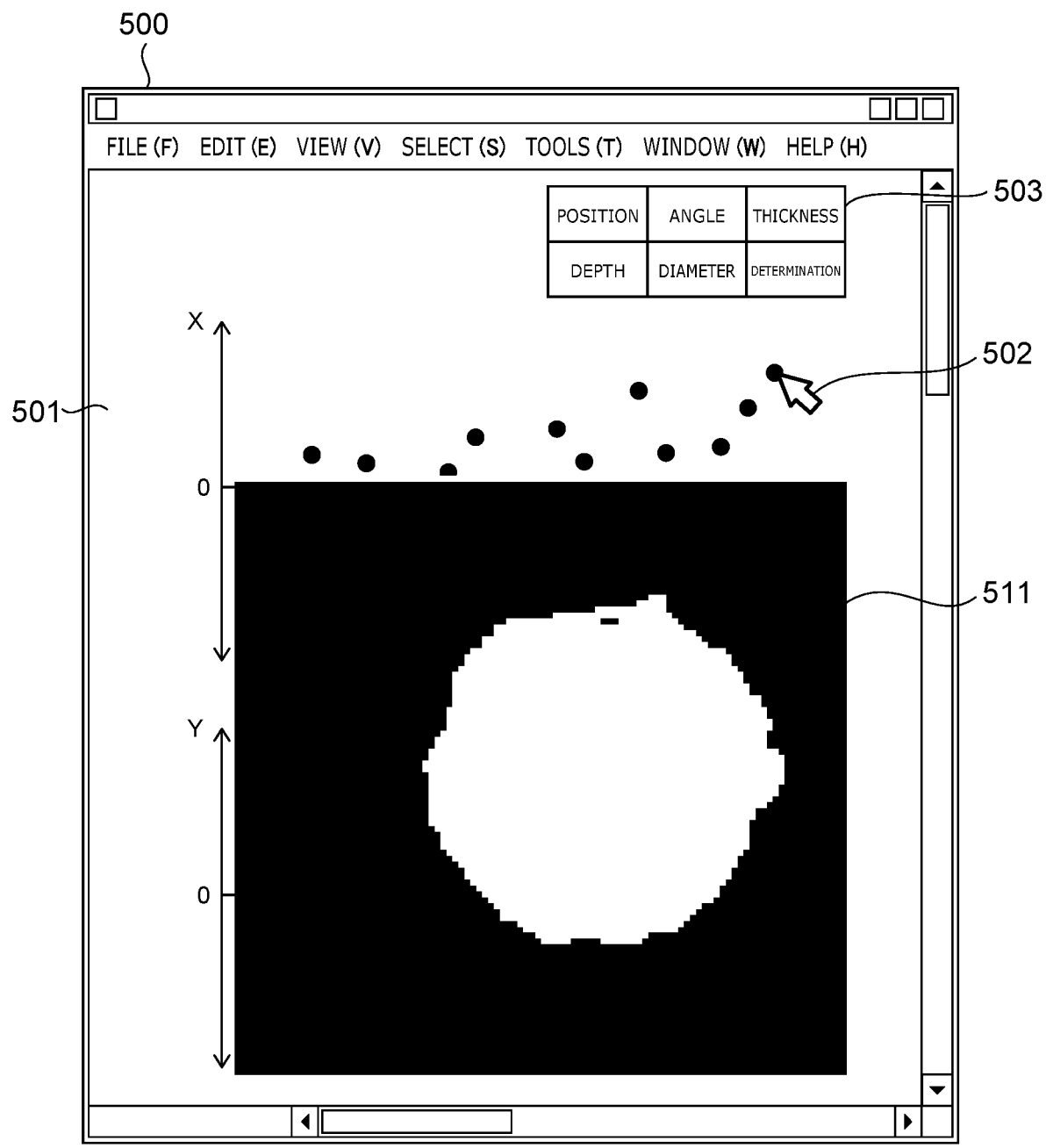
FIG. 24 is a schematic view illustrating a user interface.

When some data is selected as shown in FIG. 24, the data processing device 10 may display image data 511 acquired when the inspection data including the data was obtained. In the example, the image data 511 is an image of the identified weld portion 330. As the image data 511, at least one selected from the image of the three-dimensional intensity distribution shown in FIG. 13, the image of the determination result of the joint shown in FIG. 14A, the image of the two-dimensional intensity distribution shown in FIG. 14B or FIG. 14C, and the image of the weld portion shown in FIG. 15 may be displayed.

Figure 25:
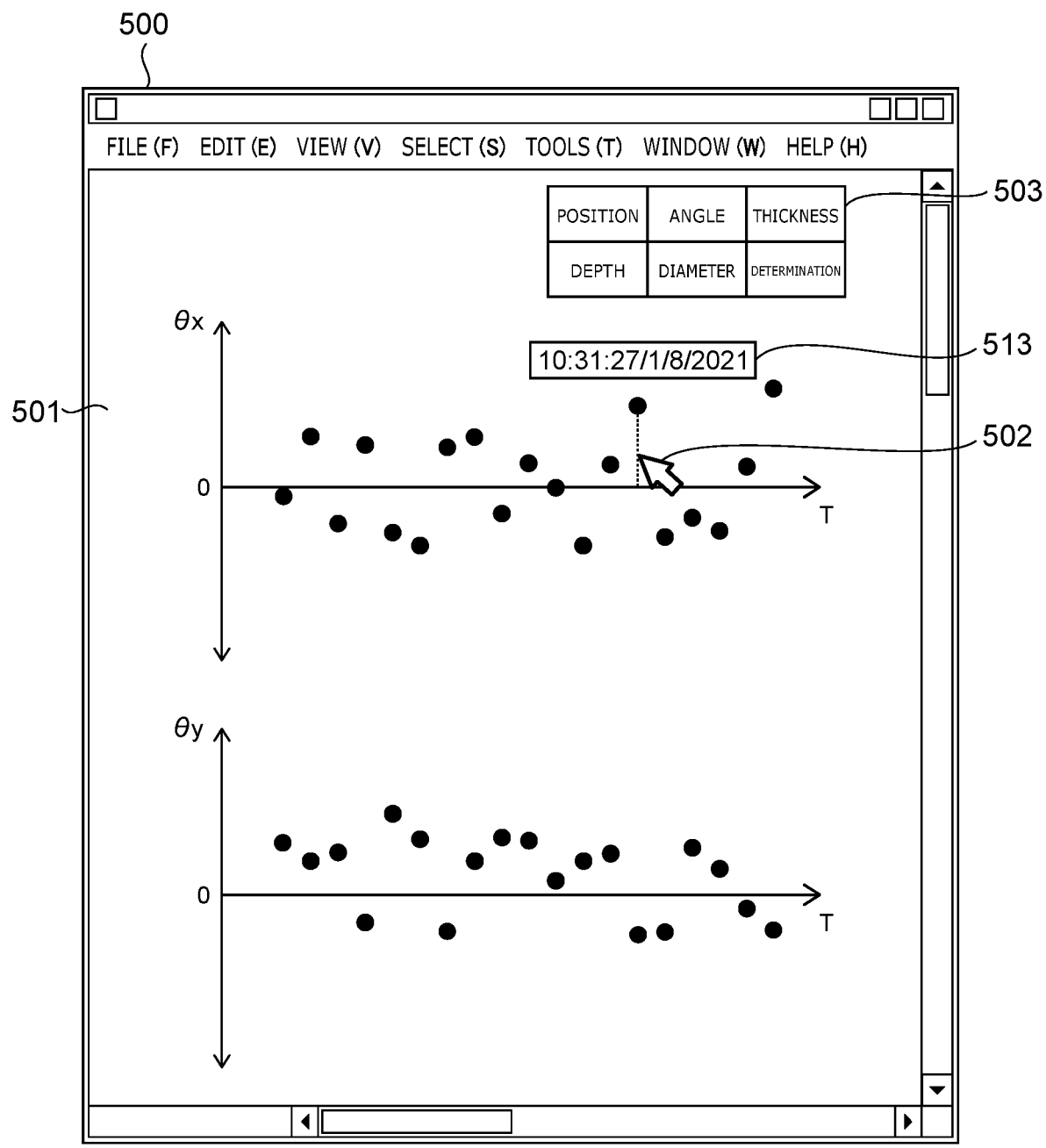
FIG. 25 is a schematic view illustrating a user interface.
Figure 26:
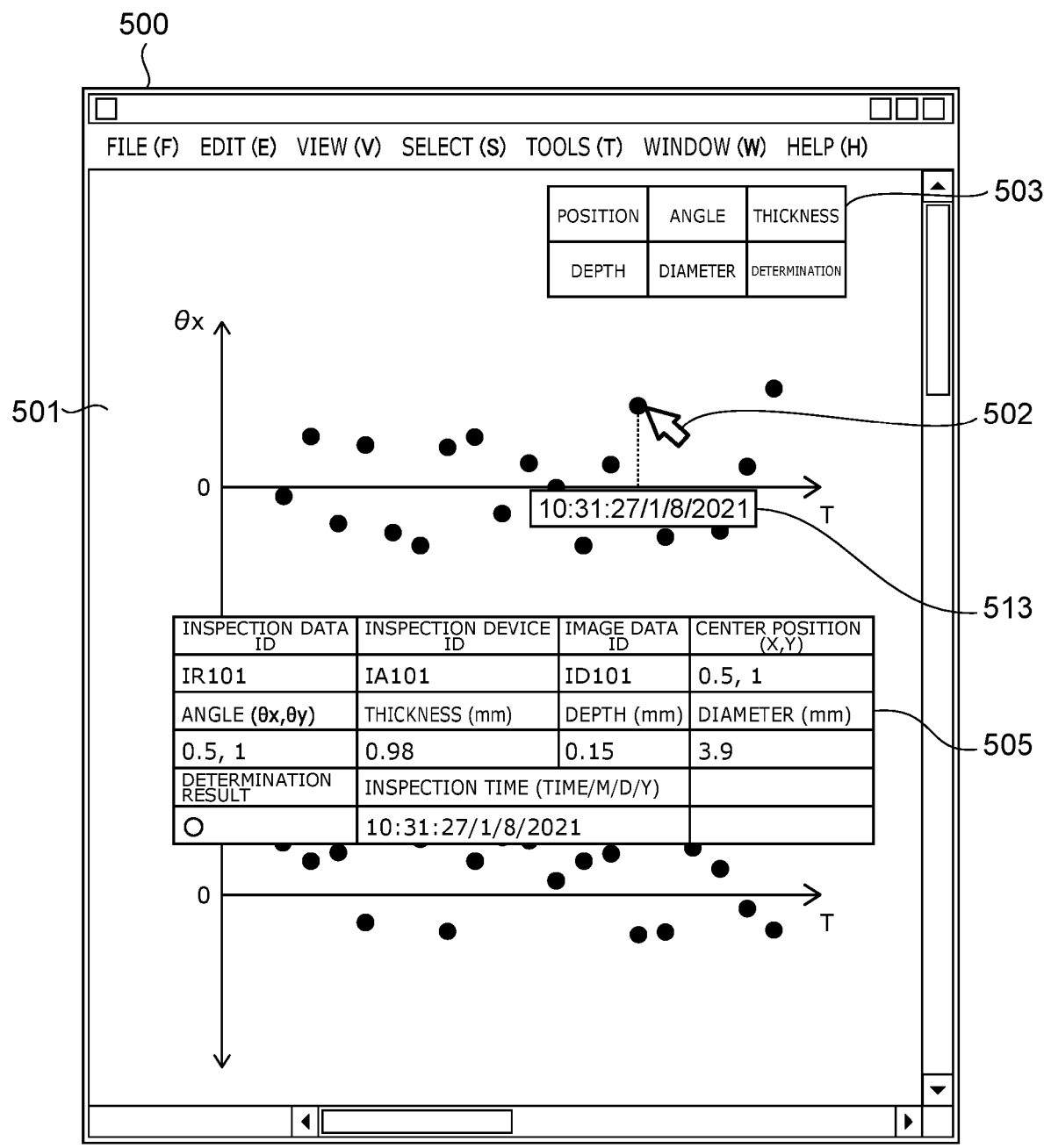
FIG. 26 is a schematic view illustrating a user interface.

The data processing device 10 may be capable of accepting a selection of time in a state in which the change of the inspection value with respect to time is displayed. For example, as shown in FIG. 25, when the pointer 502 approaches some inspection value, an inspection time 513 at which the inspection value most proximate to the pointer 502 was obtained is displayed. When the inspection value or the inspection time 513 is selected, the data processing device 10 displays the window 505 that shows the inspection data obtained at the inspection time as shown in FIG. 26.

The data processing device 10 may compare the inspection values to a preset threshold. For example, the data processing device 10 compares the position of the position data or the angle of the angle data to a threshold. The position data is the position of the weld portion 330. The position of the weld portion 330 is represented using the design position of the weld portion 330 as the origin. In other words, the position of the position data is the deviation amount from the design position of the weld portion 330. The angle data is the angle of the weld portion 330. More specifically, the angle of the weld portion 330 is the tilt of the upper surface of the weld portion 330 with respect to the pre-taught orientation of the detector 232.

The data processing device 10 may output a notification when the position is greater than a threshold preset for the position data or when the angle is greater than a threshold preset for the angle data. For example, the data processing device 10 transmits the notification to a preregistered terminal device. The data processing device 10 may output the notification to the output device 30.

The data processing device 10 may compare the thickness of the weld portion 330, the depth of the recess of the weld portion 330, or the diameter of the weld portion 330 to the preset thresholds. The data processing device 10 outputs a notification when the thickness is less than the threshold, when the depth is greater than the threshold, or when the diameter is less than the threshold. When the goodness of the weld is determined, the inspection data includes the determination result of the goodness of the weld, i.e., the comparison result between the diameter and the threshold. In such a case, the data processing device 10 refers to the determination result of the goodness of the weld. The data processing device 10 outputs a notification when the weld is determined to be defective. For example, the data processing device 10 compares the inspection value to the threshold in response to the reception of the inspection value.

Here, the inspection value and the weld portion 330 are taken to be an "abnormality" when one of the position, the angle, the thickness, or the diameter is less than the threshold or when the depth is greater than the threshold. For example, a "defect" of the weld portion 330 is one type of an "abnormality" of the weld portion 330. When the inspection value is abnormal, there is a possibility that an abnormality may exist in the welding device 100 or the transfer device of the joined body 300. When the inspection value is greater than the threshold, the user can be prompted by the output of the notification to pay attention.

Other than the comparison result between the inspection value and the threshold, the data processing device 10 may output a notification as appropriate based on the change of the inspection value. For example, the data processing device 10 receives the newest inspection data related to a specific weld portion number. The data processing device 10 refers to the directly-previous inspection data related to the weld portion having the same number. The data processing device 10 refers to the newest inspection value and the directly-previous inspection value related to the weld portions having the same number in the newest inspection data and the directly-previous inspection data. The data processing device 10 outputs a notification when the changes of the inspection values are greater than the thresholds.

When the change of the inspection value is large, there is a possibility that an abnormality may exist in the manufacturing line even when the inspection value is not determined to be abnormal based on the threshold. When the change of the inspection value is large, the user can be prompted to pay attention by outputting a notification.

Figure 27:
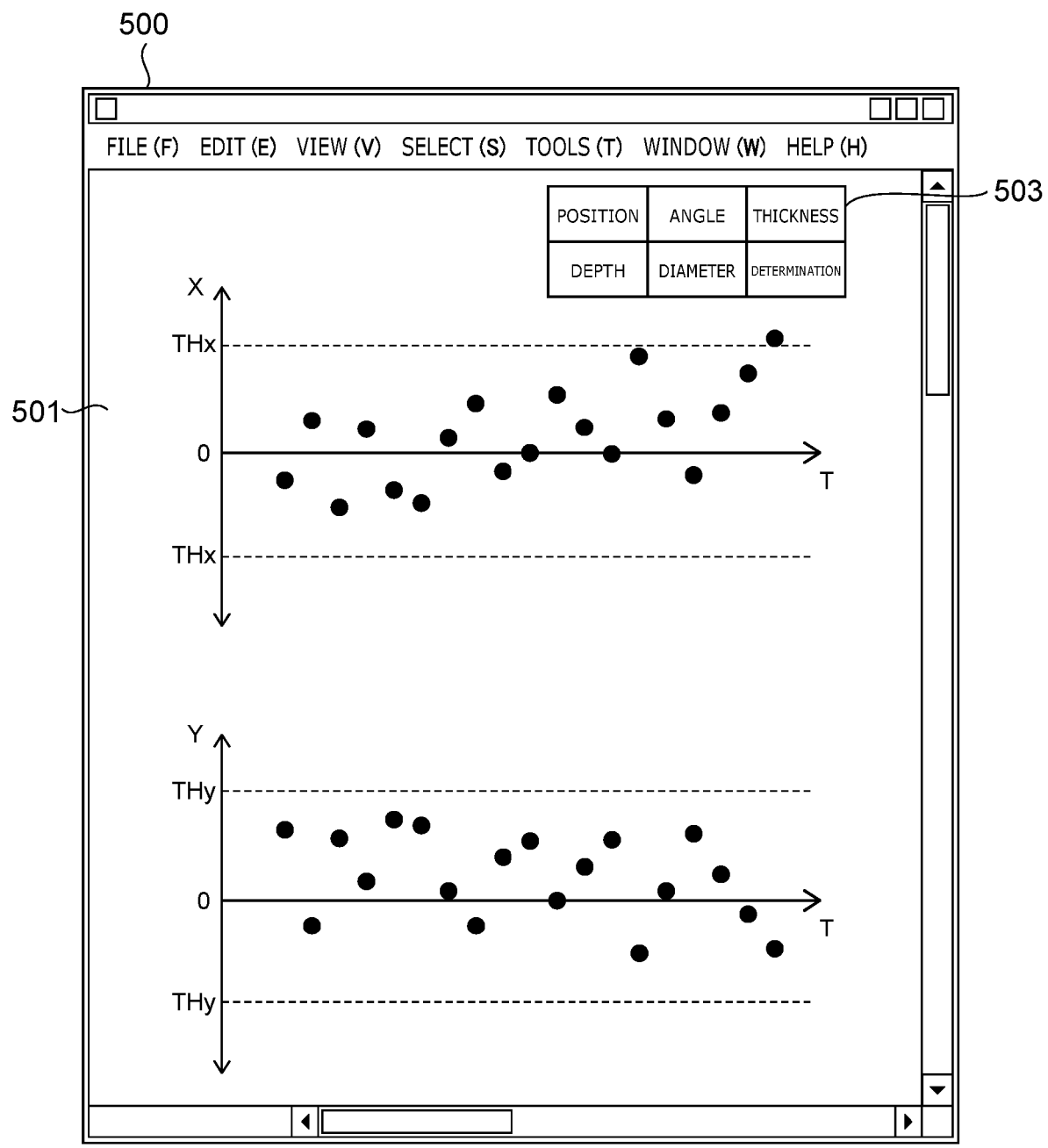
FIG. 27 is a schematic view illustrating a user interface.
Figure 28:
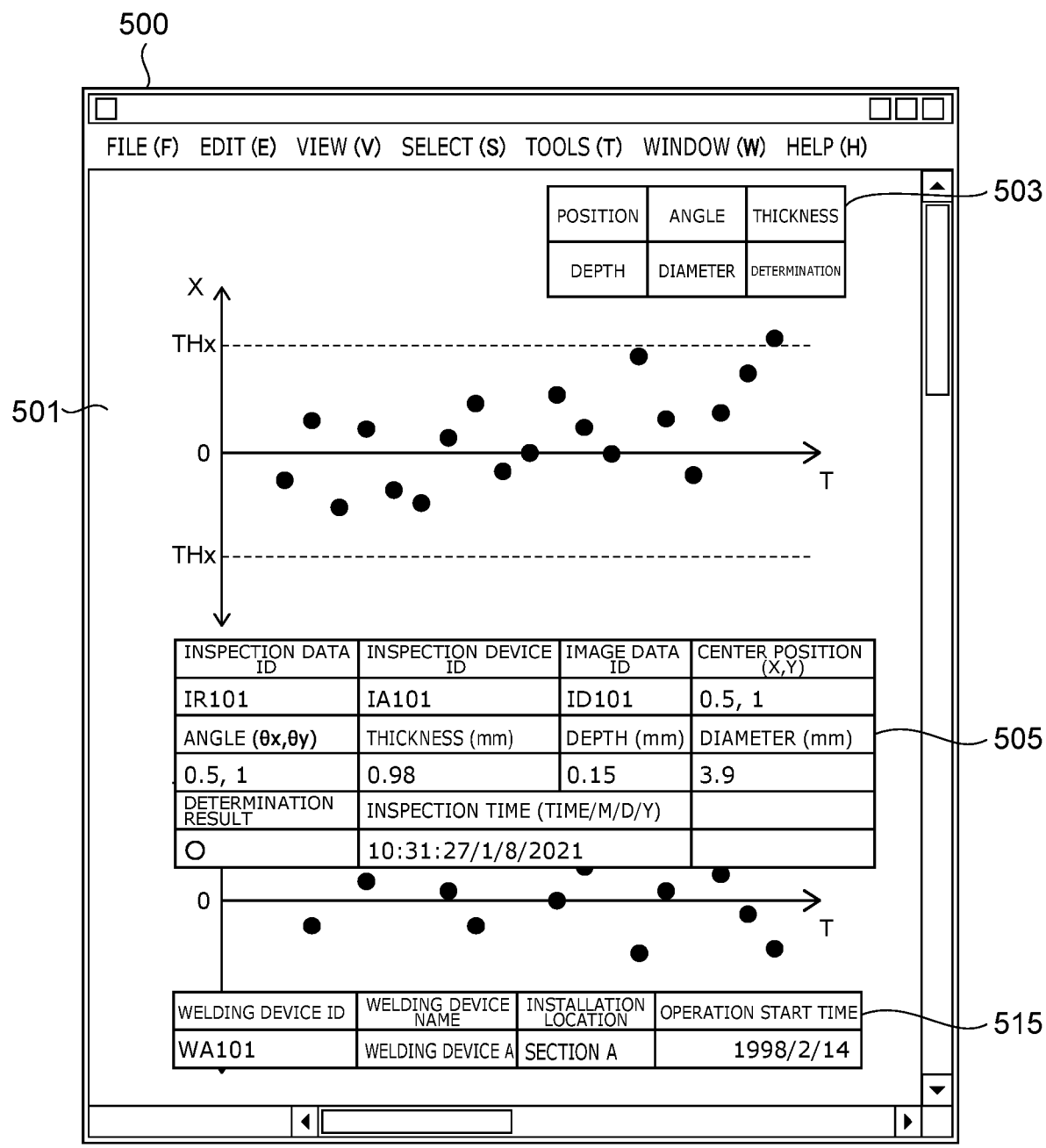
FIG. 28 is a schematic view illustrating a user interface.

As shown in FIG. 27, the data processing device 10 may display a comparison of the inspection values and the threshold. In the example of FIG. 27, a comparison of a threshold THx and the X-direction position is shown, and a comparison of a threshold THy and the Y-direction position is shown. When an inspection value is greater than the threshold as shown in FIG. 28, the data processing device 10 may display the window 505 showing the inspection data related to the inspection value and a window 515 showing data of the welding device that formed the weld portion 330 related to the inspection value.

When the inspection value is greater than the threshold, the data processing device 10 may refer to the welding condition data when forming the weld portion 330 related to the inspection value. The data processing device 10 compares the number of consecutive uses of the electrode to a threshold. The data processing device 10 outputs a notification when the number of consecutive uses is less than a lower limit or greater than an upper limit. The notification includes at least one selected from a notification indicating the likelihood of a defect of the electrode of the welding device and a notification prompting maintenance of the electrode.

When the number of consecutive uses of the electrode is too high, there is a possibility that the electrode may degrade and affect the characteristics of the weld portion 330. A low number of consecutive uses of the electrode indicates that the number of times that the electrode has been used after replacement or after grinding is low. When the number of consecutive uses of the electrode is low, there is a possibility that a defect occurred in the replacement task or the grinding of the electrode. In either case, the electrode is estimated to be the cause of the abnormality inspection value. By outputting the notification, the user can be notified of the possible cause of the abnormality.

Welding Condition Correction

When the inspection value is abnormal, the data processing device 10 may correct the welding conditions to improve the inspection value. For example, when the diameter is abnormal, the data processing device 10 increases the setting value of at least one selected from the current value, the pressing force value, the supply time of the current, and the pressing time. The data processing device 10 may directly correct the setting value or may transmit the correction percentage of the setting value to the welding device 100.

As an example, the metal plate 310 and the metal plate 320 are carbon steel. The thickness in the Z-direction of the metal plate 310 is 1.2 mm. The thickness in the Z-direction of the metal plate 320 is 1.2 mm. When performing the welding, the current value is set to 13 kA. The pressing force value is set to 500 kgf. The conduction time is set to 60 milliseconds. The current is provided two times. The pressing time is set to 2 seconds. The diameter of the weld portion 330 must be greater than 6.2 mm to obtain a shear strength that is greater than 1000 MPa. In such a case, the threshold including a margin is set to 6.4 mm.

For example, the current value is set to 14 kA when the diameter falls below 6.4 mm. Or, the pressing force value may be set to 600 kgf. Or, the conduction time may be set to 80 milliseconds. Or, the pressing time may be set to 2.5 seconds. Thereby, more energy can be provided to the parts when joining, and the diameter of the weld portion 330 can be increased.

The strength of the weld portion 330 may decrease when the thickness of the weld portion 330 is too small. Also, for the joined body 300, the ratio of the thickness of the weld portion 330 to the thickness of the solidified portion 340 must not be less than a prescribed ratio. For example, the thickness of the weld portion 330 decreases as the pressure on the parts when welding increases. The data processing device 10 reduces the pressing force value or the pressing time when the thickness is less than a threshold.

When the depth of the recess of the weld portion 330 is too large, a discrepancy may occur in the joined body 300 in a subsequent process. For example, in a coating process, there is a possibility that the appearance may degrade if coating cannot uniformly adhere to the recess of the weld portion 330. In a cleaning process, there is a possibility that dirt inside the recess may not be sufficiently removed. The recess increases as the pressure on the parts when welding increases. The data processing device 10 reduces the pressing force value or the pressing time when the depth of the recess is greater than a threshold.

Cause Estimation

When an inspection value is abnormal, the data processing device 10 may estimate the cause of the abnormality. For example, the memory device 20 stores corresponding data of the correspondence between the event and the cause of the abnormality for each abnormal type. The data processing device 10 refers to the corresponding data when the inspection value is abnormal. The data processing device 10 estimates the cause of the abnormality according to the corresponding data. The data processing device 10 outputs the estimated cause. For example, the data processing device 10 causes the output device 30 to display the cause. The data processing device 10 may transmit the cause to a prescribed terminal device.

FIGS. 29A and 29B are tables illustrating corresponding data.

The corresponding data 600a shown in FIG. 29A includes a type 601 of the abnormality, events 611 to 616, causes 621 to 624, and a score 630. For example, a condition (a threshold) is preset for each type of abnormality related to the inspection value. When any of the conditions are satisfied, an abnormality that satisfies the condition is determined to exist in the inspection value. The type 601 is the determined type of abnormality. The events 611 to 616 include events related to the inspection value and events related to welding. The causes 621 to 624 are causes of the abnormality. The score 630 is set for each combination of the event and the cause and represents the relationship between the event and the cause.

In the example of FIG. 29A, the type 601 of "large tilt" indicates that the angle of the weld portion 330 is greater than the preset threshold. The event 611 indicates that the joined body is welded by a specific welding device 100, and the same type of abnormality as the type 601 also occurred previously. The event 612 indicates that the same type of abnormality as the type 601 also occurred previously in a joined body 300 different from the inspected joined body 300 in another weld portion 330 at the same position as the weld portion 330 determined to be abnormal. The event 613 indicates that the abnormality occurred within a short time period from switching the product type of the manufactured joined body 300. The event 614 indicates that the number of consecutive uses of the electrode used for the weld portion 330 determined to be abnormal is less than the preset threshold. The event 615 indicates that the number of consecutive uses of the electrode used for the weld portion 330 determined to be abnormal is more than the preset threshold. The event 616 indicates that the misalignment of the position of the weld portion 330 with respect to the design position is greater than the preset threshold.

The cause 621 indicates that the welding device 100 includes a cause of the abnormality. The cause 622 indicates that the lower electrode 112 or the upper electrode 122 of the welding device 100 includes a cause of the abnormality. The cause 623 indicates that the welding condition when welding includes a cause of the abnormality. The cause 624 indicates that a transfer device that transfers the joined body 300 to the inspection device 200 includes a cause of the abnormality. A score that indicates the relationship is set for each cause and for each event. For example, a higher score indicates a higher relationship between the abnormality and the cause.

The memory device 20 stores multiple conditions for determining multiple events. When an inspection value is determined to be abnormal, the data processing device 10 refers to the corresponding data associated with the type of abnormality determined. The data processing device 10 compares the various data obtained by the data processing system 1 with multiple conditions for multiple events. The data processing device 10 extracts the events that satisfy the conditions. The data processing device 10 acquires scores of the causes for the extracted events according to the corresponding data. The data processing device 10 sums the scores for each event and for each cause. The data processing device 10 determines that the cause having the highest score is the cause of the abnormality.

As an example, when the abnormality of "large tilt" is determined and the conditions of the events 612 and 615 are satisfied, the score of the cause 622 of "electrode" is greatest according to the data shown in FIG. 29A. The data processing device 10 determines that the cause of "large tilt" is "electrode".

Corresponding data 600*b* shown in FIG. 29B includes a type 602 of the abnormality, the events 611 to 617, and the causes 621 to 624. The type 602 of "small weld diameter" indicates that the diameter of the weld portion 330 is less than a preset threshold. The event 617 indicates that the angle of the weld portion 330 is greater than a preset threshold. As an example, the abnormality of "small weld diameter" is determined, and when the conditions of the events 611 and 612 are satisfied, the score of the cause 621 of "welding device" is greatest according to the data shown in FIG. 29B. The data processing device 10 determines that the cause of "small weld diameter" is "weld portion".

The corresponding data is prepared by the user beforehand. The items of the rows, the items of the columns, and the scores of the corresponding data may be corrected as appropriate after generating the corresponding data. Here, an example is described in which corresponding data is prepared for each type of abnormality. Other than the example, the multiple sets of corresponding data may be grouped in one table.

Or, the determination of the type of the abnormality and the extraction of the cause may be performed by a model. For example, models include artificial perceptrons, deep neural networks, classifiers trained by random forests, or Bayes classifiers. The model outputs the determination result of the existence or absence of the abnormality and the cause of the abnormality according to the input of the various data from the data processing system 1. The data processing device 10 inputs the various data from the data processing system 1 to the model. The data processing device 10 acquires the determination result and the cause from the model.

The model may include a mathematical model that outputs the determination result of the existence or absence of the abnormality and the cause of the abnormality according to the input of the various data from the data processing system 1. The mathematical model is pre-generated using regression analysis, etc.

FIGS. 30A to 30E and FIGS. 31A to 31D describe output examples.

FIGS. 30A and 30B are schematic views showing identified weld portions 330 of different joined bodies. The outer edges of the images correspond to the outer edge of the range in which the probe is performed. The image shows a position 335 of the center of the weld portion 330. FIGS. 30C and 30D show data related to the joined bodies for which the images of FIGS. 30A and 30B were obtained.

The data of FIG. 30C is related to a joined body A of a product type X. The data of FIG. 30D is related to another joined body B of the same product type X. The joined body A is welded by a welding device A. The joined body B is welded by a welding device B. The weld portion number of the weld portion for which the data of FIG. 30C was obtained is the same as the weld portion number of the weld portion for which the data of FIG. 30D was obtained. In the data of FIGS. 30C and 30D, "center position" is the misalignment of the center position of the weld portion 330 with respect to the design position.

For example, for the joined body 300 for which the data of FIG. 30D was obtained, the diameter of one weld portion 330 is small, and the one weld portion 330 is determined to be abnormal. The data processing device 10 refers to the corresponding data related to the abnormality of "small weld diameter". The data processing device 10 determines whether or not the data shown in FIG. 30D satisfies the conditions of the events. The data processing device 10 estimates the causes of the abnormalities based on the events that satisfy the conditions.

As an example, in the data of FIG. 30D, "center position" and the time and date of "equipment operation start" are determined to satisfy the conditions of the events. Based on these events, the welding device is determined to include a cause of the abnormality. As shown in FIG. 30D, the data processing device 10 may display a mark 523 prompting attention on the data that satisfies the condition of the event. As shown in FIG. 30E, the data processing device 10 may display a message 527 prompting a check of the welding device. As shown in FIGS. 30A and 30B, data that is related to another joined body welded by the same welding device may be displayed.

FIGS. 31A and 31C are examples of other data. For example, for the joined body 300 for which the data of FIG. 31A was obtained, the thickness of one weld portion 330 is small, and the weld portion 330 is determined to be abnormal. The data processing device 10 refers to the corresponding data related to the abnormality of "thin weld thickness". As shown in FIG. 31A, the data processing device 10 displays the mark 523 on the data satisfying the condition of the event. Based on the event, the electrode of the welding device is determined to include a cause. As shown in FIG. 31B, the data processing device 10 displays the message 527 prompting a check of the electrode of the welding device.

For example, for the joined body 300 for which the data of FIG. 31C was obtained, the recess of one weld portion 330 is large, and the weld portion 330 is determined to be abnormal. The data processing device 10 refers to the corresponding data related to the abnormality of "large weld recess". As shown in FIG. 31C, the data processing device 10 displays the mark 523 on the data satisfying the condition of the event. Based on the event, the welding conditions are determined to include a cause. As shown in FIG. 31D, the data processing device 10 displays the message 527 prompting a check of the welding conditions.

Figure 32:
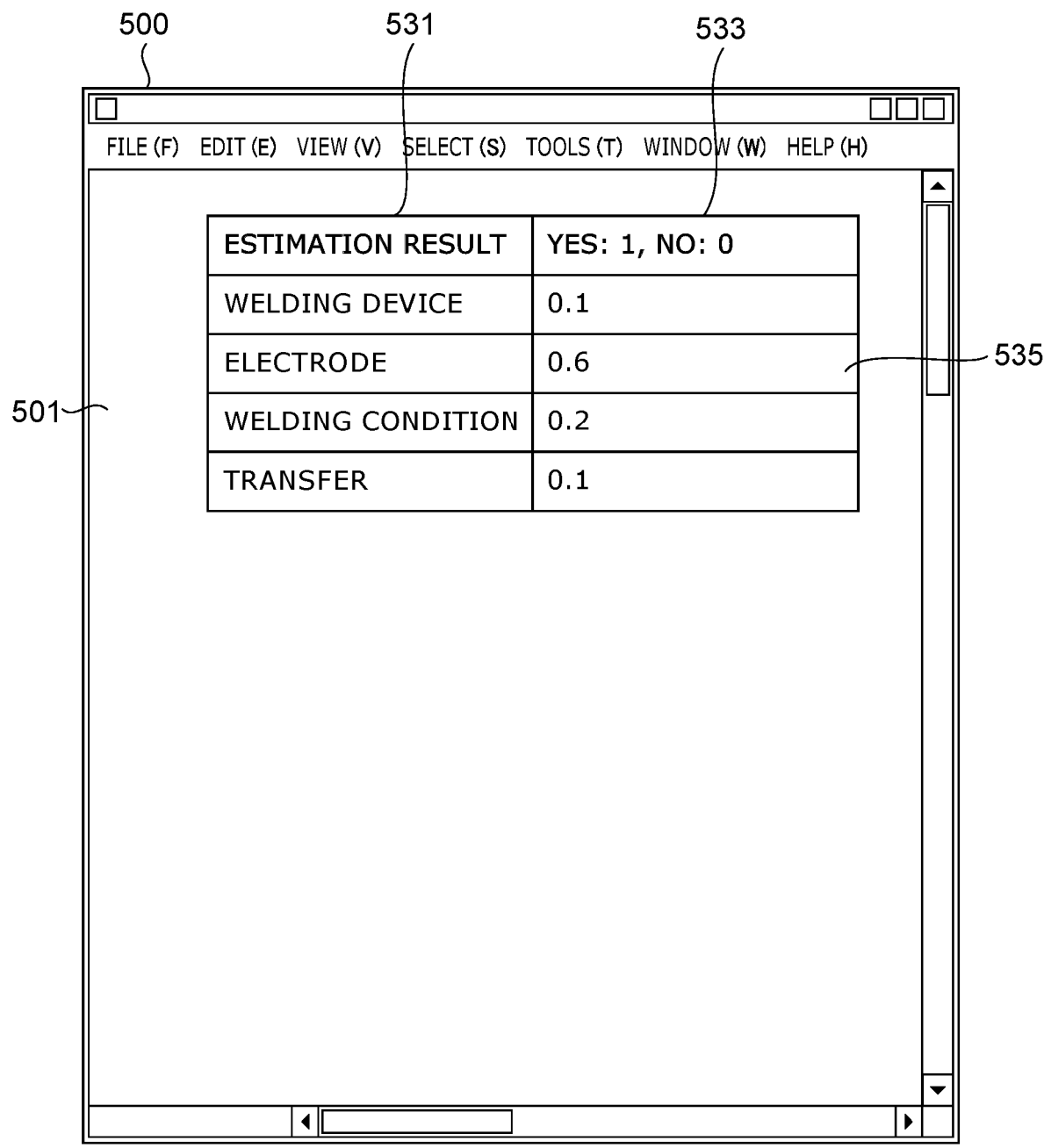
FIG. 32 is a schematic view illustrating a user interface.

FIG. 32 is a schematic view illustrating a user interface.

The data processing device 10 may display scores for the estimated causes indicating the likelihood of the cause. As shown in FIG. 32, the data processing device 10 may display a window 535 including one or more causes 531 included in the corresponding data and a score 533 of each cause. In the example, the scores are normalized so that the total of the scores equals 1. A higher score indicates a relatively higher relationship between the cause and the abnormality.

The data processing device 10 may accept feedback from the user for the estimation result of the cause. The data processing device 10 corrects the score of the corresponding data based on the feedback input from the user.

Figure 33:
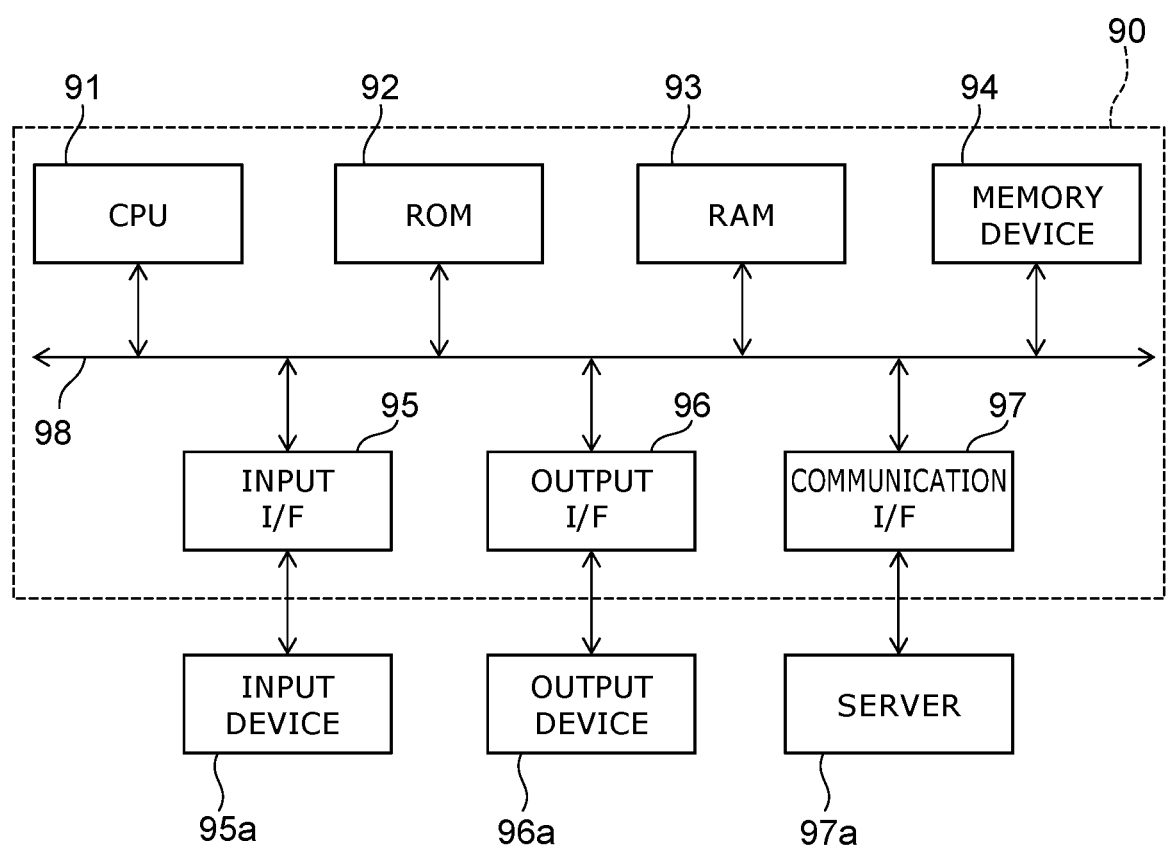
FIG. 33 is a schematic view showing a hardware configuration.

FIG. 33 is a schematic view showing a hardware configuration.

The data processing device 10, the control device 150, the control device 210, and the processing device 220 each include, for example, the configuration of a computer 90 shown in FIG. 33. The computer 90 includes a CPU 91, ROM 92, RAM 93, a memory device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit data to the output device 96a via the output I/F 96 and cause the output device 96a to display an image.

The communication interface (I/F) 97 connects the computer 90 and a server 97a that is outside the computer 90. The communication I/F 97 is, for example, a network card such as a LAN card, etc. The CPU 91 can read various data from the server 97a via the communication I/F 97.

The memory device 94 includes at least one selected from a hard disk drive (HDD) and a solid state drive (SSD). The input device 95a includes at least one selected from a mouse, a keyboard, a microphone (audio input), and a touchpad. The output device 96a includes at least one selected from a monitor and a projector. A device such as a touch panel that functions as both the input device 95a and the output device 96a may be used.

The functions of the data processing device 10, the control device 150, the control device 210, and the processing device 220 may be realized by the collaboration of multiple computers. One computer may function as at least two selected from the data processing device 10, the control device 150, the control device 210, and the processing device 220.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to the data processing device, the data processing system, or the data processing method described above, welding device data can be easily retrieved based on inspection data; and the convenience of the data can be improved. Similar effects can be obtained by using a program to cause a computer to perform the data processing method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A data processing system, comprising:
a welding device configured to make a joined body by joining a plurality of parts;
an inspection device configured to perform a probing process using a detector and generating inspection data, the detector including a plurality of detection elements arranged along a first direction and a second direction crossing the first direction, in the probing process, each of the plurality of detection elements transmitting an ultrasonic wave toward a weld portion of the joined body along a third direction and detecting a reflected wave to obtain intensity data, the third direction crossing a first plane that is parallel to the first direction and the second direction, the inspection device being configured to perform
detecting the weld portion from intensity data by determining whether or not each of a plurality of points is in the first plane,
calculating a center position of the weld portion and an angle between the weld portion and the first plane, the angle being obtained by calculating three-dimensional intensity gradients of the reflected wave based on the intensity data and averaging the three-dimensional intensity gradients, and
generating inspection data including position data including the center position and angle data including the angle;
a data processing device configured to
receive a plurality of sets of welding device data from the welding device, each of the plurality of sets of welding device data including a welding device ID for identifying the welding device,
receive a plurality of sets of the inspection data,
associate the plurality of sets of inspection data with the plurality of sets of welding device data, respectively; and
an output device, the data processing device configured to
cause the output device to display a user interface showing a change of a plurality of the positions with respect to time or a change of a plurality of the angles with respect to time,
accept a selection of one of the times through the user interface, and
cause the output device to display one of the plurality of sets of inspection data obtained at the selected time.

2. The data processing system according to claim 1,
the data processing device configured to
receive a plurality of sets of the welding device data and a plurality of sets of the inspection data, and
output a change of a plurality of the positions with respect to time or a change of a plurality of the angles with respect to time to the output device.

3. The data processing system according to claim 1, wherein when the data processing device accepts a selection of one of the plurality of positions or one of the plurality of angles through the user interface, the data processing device causes the output device to display one of a plurality of the welding devices ID associated with one of the plurality of sets of inspection data including the position data or angle data.

4. The data processing system according to claim 3, wherein each of the plurality of sets of inspection data further includes at least one datum selected from the group consisting of an image of the weld portion based on the intensity data, a thickness of the weld portion, a depth of a recess of the weld portion, and a diameter of the weld portion, and the data processing device configured to cause the output device to display the at least one datum included in the one of the plurality of sets of inspection data when the selection of the one of the plurality of positions or the one of the plurality of angles is accepted.

5. The data processing system according to claim 3, wherein the data processing device configured to cause the output device also to display welding condition data of a condition of a weld related to the selected one of the plurality of positions or one of the plurality of angles.

6. The data processing system according to claim 5, wherein the welding condition data further includes at least one selected from the group consisting of a current value flowing in the plurality of parts, a pressing force on the plurality of parts, a pressing time on the plurality of parts, and a number of consecutive uses of an electrode of the welding device.

7. The data processing system according to claim 1, wherein the data processing device configured to output a notification when a distance between the position of the position data and a predesigned position of the weld portion or the angle of the angle data is greater than a threshold.

8. The data processing system according to claim 7, the data processing device configured to cause the output device to output at least one of the inspection data or the welding device data when a distance between the position and a predesigned position of the weld portion or the angle is greater than the threshold.

9. The data processing device according to claim 7, wherein the data processing device configured to receive welding condition data of a condition of a weld performed by the welding device identified by one of a plurality of the welding devices ID, the welding condition data including a number of consecutive uses of an electrode of the welding device, determine whether or not the number of consecutive uses is less than a lower limit or greater than an upper limit when the position or the angle is greater than the threshold, and output at least one selected from the group consisting of a notification indicating a likelihood of a defect of the electrode and a notification prompting maintenance of the electrode when the number of consecutive uses is less than the lower limit or greater than the upper limit.

10. The data processing system according to claim 1, wherein the welding device data includes an operation start date of the welding device.

11. The data processing system according to claim 1, wherein weld portion data that includes data for identifying the weld portion of the joined body also is received, and the data processing device configured to associate the weld portion data with the inspection data and the welding device data and stored.

12. The data processing system according to claim 1, wherein the data processing device is configured to correct a condition of a weld performed by the welding device when a distance between the position and a predesigned position of the weld portion or the angle is greater than a threshold.

13. The data processing system according to claim 1, the data processing device configured to refer a database including an event and a cause of the event for each type of a plurality of abnormalities, estimate the cause of the position or the angle when a distance between the position and a predesigned position of the weld portion or the angle is greater than a threshold, and cause the output device to output an estimation result of the cause of the position or the angle.

14. The data processing system according to claim 13, wherein the data processing device configured to cause the output device to output the cause and a score for each type of the plurality of abnormalities, and the score indicates likelihoods of the cause.

15. The data processing system according to claim 1, wherein the position of the weld portion is a center position of the weld portion in the intensity data.

16. The data processing system according to claim 15, wherein the center position is a centroid position of the weld portion in the intensity data.

17. A data processing method, comprising causing a welding device to make a joined body by joining a plurality of parts;

causing an inspection device to perform a probing process using a detector and generating inspection data, the detector including a plurality of detection elements arranged along a first direction and a second direction crossing the first direction, in the probing process, each of the plurality of detection elements transmitting an ultrasonic wave toward a weld portion of the joined body along a third direction and detecting a reflected wave, the third direction crossing a first plane that is parallel to the first direction and the second direction, causing the inspection device to perform detecting the weld portion from intensity data by determining whether or not each of a plurality of points is in the first plane, calculating a center position of the weld portion and an angle between the weld portion and the first plane, the angle being obtained by calculating three-dimensional intensity gradients of the reflected wave based on the intensity data and averaging the three-dimensional intensity gradients, and generating inspection data including position data including the center position and angle data including the angle;

causing a data processing device to receive a plurality of sets of welding device data from the welding device, receive a plurality of sets of the inspection data, associate the plurality of sets of inspection data with the plurality of sets of welding device data respectively, and store the inspection data, the welding device data including a welding device ID for identifying the welding device;

causing an output device to display a user interface showing a change of a plurality of the positions with respect to time or a change of a plurality of the angles with respect to time;

causing the data processing device to accept a selection of one of the times through the user interface; and causing the output device to display one of the plurality of sets of inspection data obtained at the selected time.

18. The data processing method according to claim 17, wherein when the data processing device accepts a selection of one of the plurality of positions or one of the plurality of angles in the user interface, the data processing method causes the processing device to cause the output device to display one of a plurality of the welding devices ID associated with one of the plurality of sets of inspection data including the selected position data or angle data.

19. The data processing method according to claim 18, wherein the result of the probing process includes intensity data of a reflected wave intensity of the ultrasonic wave from the weld portion, and the position of the weld portion is a center position of the weld portion in the intensity data.

20. The data processing method according to claim 19, wherein the center position is a centroid position of the weld portion in the intensity data.

21. A non-transitory computer-readable storage medium storing a program causing a processing device to perform the data processing method according to claim 17.

* * * * *